United States Patent
Mirmira et al.

(10) Patent No.: US 11,961,335 B1
(45) Date of Patent: Apr. 16, 2024

(54) DUAL MODE ELECTRONIC TOLL ROAD SYSTEM

(71) Applicant: HARRIS COUNTY TOLL ROAD AUTHORITY, Houston, TX (US)

(72) Inventors: Anil Mirmira, Houston, TX (US); David Patterson, Houston, TX (US); Kelsey Heath, Houston, TX (US)

(73) Assignee: HARRIS COUNTY TOLL ROAD AUTHORITY, Houston, TX (US)

( * ) Notice: Subject to any disclaimer, the term of this patent is extended or adjusted under 35 U.S.C. 154(b) by 315 days.

(21) Appl. No.: 17/357,935

(22) Filed: Jun. 24, 2021

Related U.S. Application Data

(60) Provisional application No. 63/044,725, filed on Jun. 26, 2020.

(51) Int. Cl.
    *G07B 15/06*   (2011.01)
    *G06V 20/10*   (2022.01)
    (Continued)

(52) U.S. Cl.
    CPC ........... *G07B 15/063* (2013.01); *G06V 20/10* (2022.01); *G06V 20/46* (2022.01); *G08G 1/017* (2013.01); *G06V 2201/08* (2022.01)

(58) Field of Classification Search
    CPC ... G07B 15/063; G08G 1/017; G06V 2201/08
    (Continued)

(56) References Cited

U.S. PATENT DOCUMENTS 5,448,484 A    9/1995  Bullock
7,136,828 B1   11/2006 Allen
(Continued)

FOREIGN PATENT DOCUMENTS

CN   105069472   11/2015
CN   105590102    5/2016
(Continued)

OTHER PUBLICATIONS

D. Dawar and S. A. Ludwig, "A differential evolution based axle detector for robust vehicle classification," 2015 IEEE Congress on Evolutionary Computation (CEC), Sendai, Japan, 2015, pp. 3072-3079. (Year: 2015).*

*Primary Examiner* — Jeff Zimmerman
*Assistant Examiner* — Hunter A Molnar
(74) *Attorney, Agent, or Firm* — Boulware & Valoir, PLLC

(57) ABSTRACT

A dual mode method of assessing a toll fee by collecting i) sensor data of a vehicle as it travels on a lane and determining a first axle count based on said sensor data; and 2) collecting video images of said vehicle and determining a second axle count based on said video images. The video images are analyzed using computer vision and machine learning to determine the second axle count, and the first and second axles count compared and if identical the vehicle is charged based on the axle count. However, the video images are re-analyzed if the first and second axle counts are not identical and this is repeated until identity is obtained. The system learns from its errors, and the axle count improves with time. If identity is not reached, the transaction record can be flagged for human intervention, but tests show at least 100 fold reduction in errors, thus obviating thousands of interventions per day. Ultimately, monthly summaries of charges are compiled and sent to the customer.

20 Claims, 16 Drawing Sheets

(51) Int. Cl.
*G06V 20/40* (2022.01)
*G08G 1/017* (2006.01)

(58) Field of Classification Search
USPC .......................................... 705/13
See application file for complete search history.

(56) References Cited

U.S. PATENT DOCUMENTS

| | | |
|---|---|---|
| 9,305,214 B1 | 6/2016 | Young |
| 2002/0105440 A1* | 8/2002 | Bostrom ............... G08G 1/04 340/928 |
| 2007/0208681 A1 | 9/2007 | Bucholz |
| 2010/0274641 A1* | 10/2010 | Allen .................. G08G 1/015 348/148 |
| 2011/0119013 A1* | 5/2011 | Onea .................. G08G 1/054 702/96 |
| 2017/0293808 A1 | 10/2017 | Jain |
| 2019/0378347 A1* | 12/2019 | Gallaway ............ G08G 1/0175 |

FOREIGN PATENT DOCUMENTS

| | | | |
|---|---|---|---|
| CN | 105975941 | 9/2016 | |
| WO | 2015192239 | 12/2015 | |
| WO | WO-2016140250 A1 * | 9/2016 | ............... G06T 1/00 |

* cited by examiner

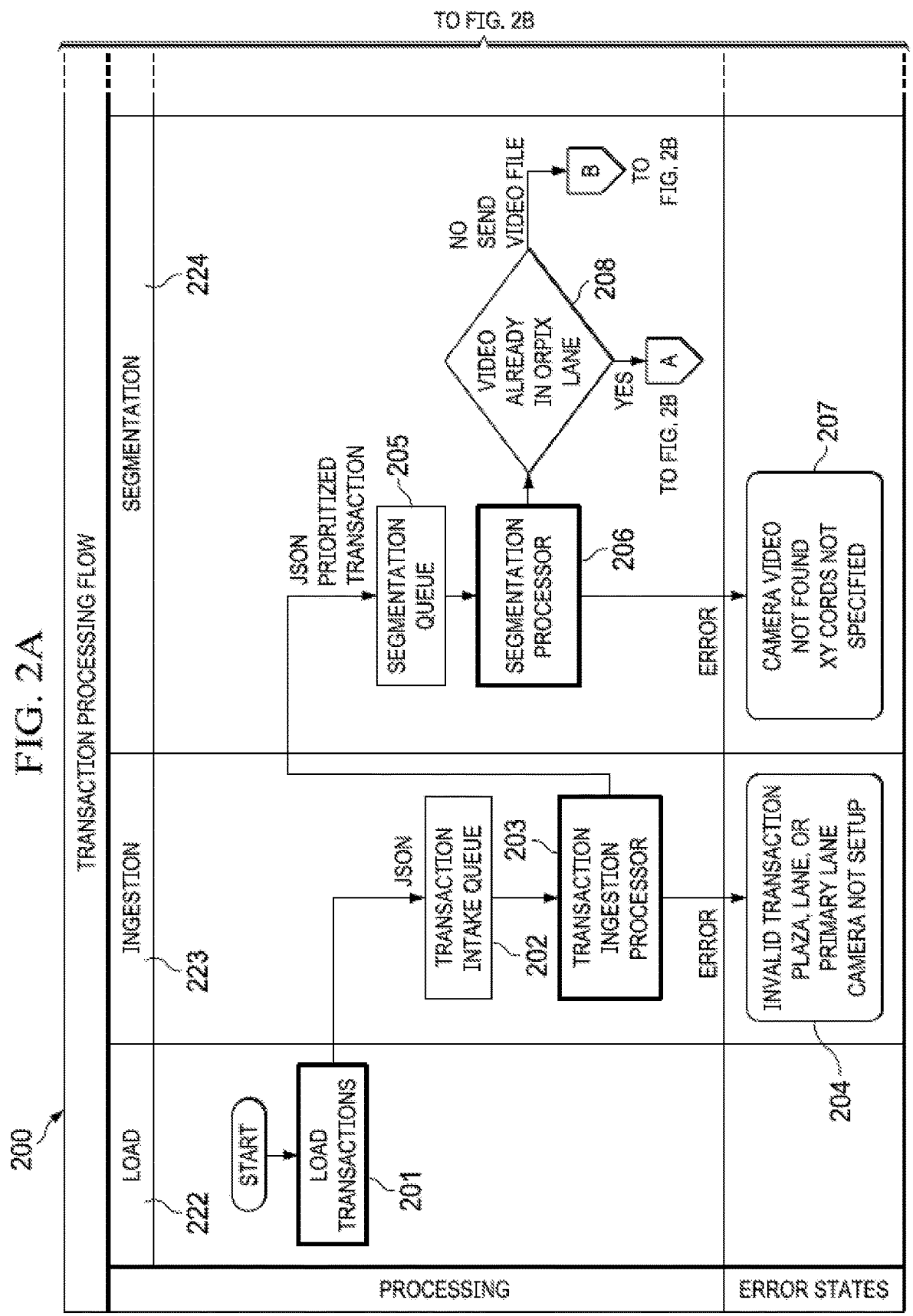

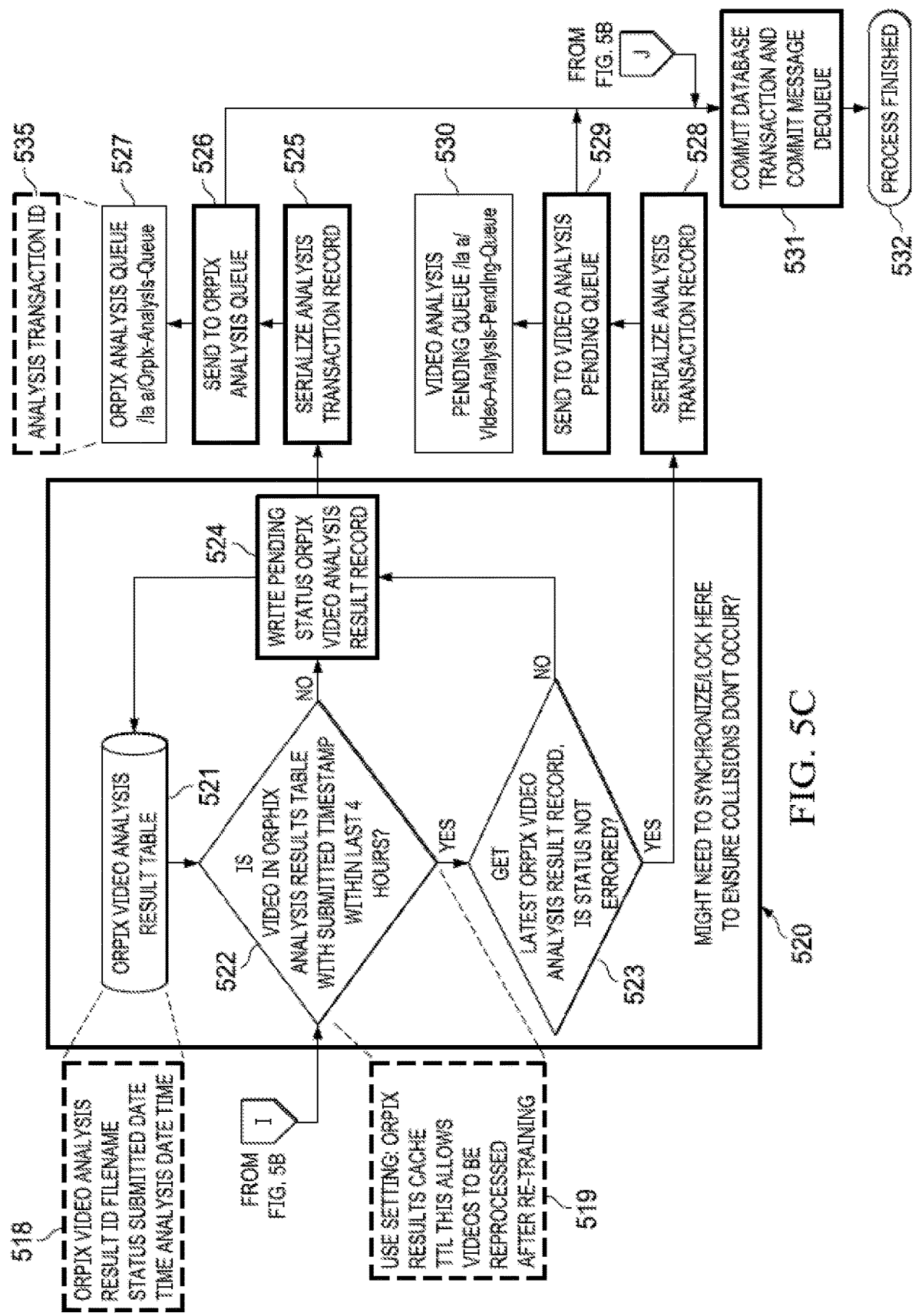

DUAL MODE ELECTRONIC TOLL ROAD SYSTEM

PRIOR RELATED APPLICATIONS

This application claims priority to U.S. Ser. No. 63/044,725, filed Jun. 26, 2020, and incorporated by reference in its entirety for all purposes.

FEDERALLY SPONSORED RESEARCH STATEMENT

Not applicable.

FIELD OF THE DISCLOSURE

The disclosure generally relates to methods of managing toll roads electronically, with greatly improved accuracy and reduced need for human intervention.

BACKGROUND OF THE DISCLOSURE

Travelers using the Susa-Babylon highway in the 7th century BC were required to pay to use the royal road. Thus, toll roads have existed for at least the last 2,700 years. A modem toll road—also known as a turnpike or tollway—is a public or private road for which a fee (aka toll) is assessed for passage. The amount of the toll usually varies by vehicle type, weight, or number of axles, with freight trucks usually charged higher rates than cars. Tolls are a form of road pricing, typically implemented to help recoup the cost of road construction and maintenance, but in modern times tolls also function to reduce congestion and improve the flow of traffic by diverting a percentage of traffic to free roads.

In early toll collection systems, attendants were employed to manually collect fares from drivers. However, the use of attendants to collect fares can create numerous problems, including the introduction of human error, inefficiencies and resulting traffic delays, salary costs, and potential embezzlement of toll revenues.

To alleviate such issues, devices have been developed to automatically operate toll collection systems without the need for attendants. Some systems automatically operate toll collection systems where the toll fees paid are a fixed price and not based upon the number of axles or vehicle type. However, this imposes an unfair burden on lightweight cars that is more appropriately born by heavy freight trucks. Thus, such simple systems are less desirable, and systems that charge by axle count are preferred in most municipalities.

Many toll systems use sensors embedded in the road to count axles. One common electromagnetic axle-counting system uses sets of electronic loops under the pavement at each toll point. As vehicles pass over the loops, they detect the vehicle's presence and "count" the number of axles on the vehicle (called vehicle classification). This technology has various disadvantages, however. For example, the electromagnetic systems detect metal in the axles, so depending on the type of vehicle they may not accurately determine the axle count. In addition, they cannot detect a stopped vehicle, nor an axle that has bounced over the sensor loop.

Another system uses pneumatic tube sensors that send a burst of air pressure along a rubber tube when a vehicle's tires pass over the tube. The pressure pulse closes an air switch, producing an electrical signal that is transmitted to a counter or analysis software. However, these are subject to inaccurate counting when truck and bus volumes are high and the system is also temperature sensitive. Further, tubes can be easily vandalized or cut by normal road use.

Other toll systems have used laser scanners that determine the shape of the vehicle. There are inherent challenges with this approach due to environmental conditions (snow, rain, dust, and the like) impeding their function, and they likewise suffer from too high an error rate.

In fact, the error rate in all existing systems is fairly high—as much as 15% for axles that are greater than 3—necessitating considerable manpower to correct such errors and refund any overpayments to travelers. If there is even a 1% error rate in a system with a million transactions a day—such as in the greater Houston area—then 10,000 corrections per day are needed. If however, the error rate could be reduced to 0.01% (100 fold reduction), then only 100 corrections per day would be needed, and staffing could be greatly reduced.

Therefore, there is a need for a system that can independently verify and audit the accuracy of the vehicle classification, and self-correct errors automatically. The ideal system would have less than 0.1% error rate, preferably less than 0.01%, thus greatly reducing staffing requirements needed to operate a tolling system. Another feature of an ideal system would be early detection of hardware or software problems, flagging a problem for immediate resolution. Another key advantage of the ideal system is to charge the customers accurately, thereby increasing the public trust, in general. This invention addresses one or more of these needs.

SUMMARY OF THE DISCLOSURE

Herein we describe a dual-mode electronic tollway system that combines video footage data with data from other sensor systems, such as road loop systems, to greatly reduce the error rate of either system alone. While videos have been used historically, they are only used for audit and dispute resolution purposes after an error has occurred and a customer complained. However, in this disclosure the video footage becomes a primary source of data and machine learning tools ensure that the system continually improves and self-corrects during usage. The dual mode system thus exhibits synergy-being much more accurate than either system alone.

In a simplified description of the method, video is captured from one or more than one side angles as the vehicle traverses the toll point. A machine learning algorithm learns how to detect and count axles/wheels, and distinguish raised axles that are not in use and side-mounted spare tires from axles that contact the road and thus are weight bearing. This data is then compared against embedded road sensor or laser scanning data, which is available in most toll road systems already. Where there is agreement between the two types of data, the system applies the correct charge and no changes are made.

However, where there is disagreement between the two systems, the machine learning algorithm will reexamine the video footage, automatically correcting any errors and thereby improving the overall accuracy. If resolution cannot be achieved, a human may intervene to make a final decision, but the frequency of such interventions is reduced at least $10^{2-3}$ fold, and most such interventions are handled during the initial training period. The decreased need for human intervention greatly improves efficiencies, reducing errors and costs.

In more detail, as a vehicle approaches and passes through the toll lane, the event is captured by side video cameras and by typically overhead still cameras. In cases where a toll tag (RFID) is not present, the still images and/or video are interpreted by OCR—optical character recognition—to match the license plate number with a customer account. If the RFID tag is present, the account can be identified that way. Discrepancies between the two identification systems can also be noted and flagged for further handling.

In addition, a file is generated with vehicle and transaction details when a vehicle drives through the toll. This file or "transaction record" includes data elements such as transaction time, date, toll point location, lane identifier, transponder number (if RFID present), plus copies of sensor/video data can be contained therein or linked thereto. A preliminary axle count is based on classification from the embedded sensor systems or laser scanning systems, and the suggested toll amount to charge the patron is also included in the transaction record.

These transaction details are typically relayed to a centralized computer system for reviewing the transaction and associated details (including transaction time), charging the customer's account, and creating an entry in the financial accounting system. However, relay is not essential, but a function of efficiency and cost, and the analysis could theoretically be local. In a preferred embodiment, the original data is compared against the centralized copy of the data, ensuring that no details were lost in the transfer. This provides yet another level of error correction.

In order to more accurately calculate the axle count, we have developed a proprietary solution that takes the typical loop or laser based transaction record, matches it with the video of the vehicle transaction, and determines the axle count by analysis of the video using computer vision software and machine learning. It also determines if the correct vehicle was assigned the correct axle count, based on agreement with the sensor loop classification, hence the toll amount to assess. Where there is disagreement, the software reviews the video again to determine a correct axle count, and learns from any errors, thus continually improving.

In our proof of concept testing, we found that the loop system alone has a 10% error rate for axles greater than 3, and 5% overall. The video system alone was improved over the loop sensors, having only 1.5% error. However, the combined system was synergistic, reducing errors to less than 0.05%. Further, since the software learns as it processes and corrects the data, the system can incrementally improve. Error cannot be eliminated, of course, but the automated dual mode analysis of both sensor and video data is a significant improvement over the prior art, reducing errors by at least two orders of magnitude or more.

In addition, we have developed an algorithm to first identify the best video frame(s) for analysis, defined as the frame(s) where the vehicle is in clearest/fullest view of the camera, so that a machine learning tool can analyze the video and retrieve the axle count for the corresponding toll transaction. Use of this method greatly reduces processing time, as the system can quickly home in on the best images, and avoid examining non-productive images.

Frame identification is based on criteria such as expected frame timestamp (when the vehicle should be in the clearest/fullest view of the camera), vehicle speed, vehicle length, and distance (between the camera and the position of the vehicle when the transaction was recorded.). Then, the expected frame timestamp is used to find the video frame that has the highest confidence of the correct axle count as determined by the machine learning tool. In many instances, a plurality of video images must be reviewed, since the vehicle may be quite long and/or travelling at high speeds.

For example, FIG. 1A represents the current sensor layout (not to scale) for the Harris county toll lanes. It shows a prior art loop-based system, wherein Entry Loops are the primary presence detection loops in the roadway and the Axle Loops are the gradient loops that counts the axles passing through the lane. In this figure, E1 is the first primary sensor which senses presence of a vehicle entering the lane. A1 is the gradient sensor which along with A2 senses the axles and assists in placing vehicles in the appropriate lane. E2 is primary sensor which senses presence of the vehicle exiting the lane.

Distances, vehicle length and speed are used to determine the ideal analysis position for a vehicle in the camera view, according to EQ. 1:

$$RT \text{ Frame Time} = RT \text{ Time} - \frac{\frac{1}{2}\text{length}_{veh} + \text{Position}}{1.467 \text{ speed}_{veh}} - \text{Offset}_{ORT} \qquad \text{EQ. 1}$$

wherein RT Frame Time is the calculated time when vehicle is fully visible in the camera view, RT Time is Transaction Time in the system, $\text{length}_{veh}$ is vehicle length in feet, Position is length from the trailing edge of P4 to the position in the lane with best camera view in feet, $\text{Speed}_{veh}$ is the speed of the vehicle in miles per hour, and $\text{Offset}_{ORT}$ is a placeholder for any latency discovered between the lane equipment that needs to be accounted for in seconds.

As the vehicle travels thru the lane, it passes thru the E1, A1, E2 and A2 loops in sequence. The goal of Equation 1 is to find the appropriate time when the vehicle is fully visible in the camera view (RT Frame Time). The timestamp as the vehicle exits the trailing edge of the E2 loop, is the RT Time. RT Time is also sent to the back office as the system of record time when the transaction was created. RT Frame Time depends on the length of the traveling vehicle, the speed at which it is travelling and an environment variable known as "position." Position is based on the distance between the camera and the trailing edge of the E2 loop. The offset is the place holder for any latency between the lane equipment that needs to be accounted for in milliseconds.

For example, let us assume that vehicle that is 18 feet in length is travelling at 40 mph and let us assume that vehicle exits the P2 loop at 9:00:00 AM, based on the equation the best time of video is 8:59:59:406 AM. If the vehicle was travelling at 60 mph, the best time of video is 8:59:59:611 AM. If an 18 wheeler (80 feet in length) is travelling at 40 mph, then the best time of video is 8:59:58:878.

The invention thus includes any one or more of the following embodiments, in any and all possible combination(s) thereof:

A method of assessing a toll fee at a toll point in a toll road system by:
collecting sensor data of a vehicle at a toll point and determining a first axle count based on that sensor data;
collecting video images of the vehicle;

-continued collecting i) still camera images or ii) RFID identity data, or both and determining vehicle identity based on same;
creating a transaction record in a computer system including copies (or links thereto) of the video images, still camera images, sensor data, date, time, lane identity, toll point identity, vehicle identity, and first axle count;
-analyzing the video images using computer vision and machine learning to determine a second axle count;
comparing the first and second axle count and if identical, charging the vehicle based on the identical axle count, but if not identical, re-analyzing the video images to determine a revised second axle count and optionally repeating same until the first and second axle count are identical, or flagging the transaction record for human intervention if identity cannot be reached.
A dual mode method of assessing a toll fee at a toll point in a toll road system, the dual mode method including in any suitable order the steps of:
collecting electromagnetic loop sensor data of a vehicle at a toll point and determining a first axle count based on same;
collecting side angle video images of the vehicle;
collecting overhead still camera images and RFID identity data of the vehicle and determining vehicle identity based one or both;
creating a transaction record in a computer system comprising all relevant vehicle data;
analyzing the video images using computer vision and machine learning to determine a second axle count;
comparing the first and second axle counts and optionally repeating the video analysis and comparison until the first axle count and the second axle count are identical, and then charging the vehicle a toll based on that identical axle count;
generating a monthly summary of charges to the vehicle and sending the monthly summary to the owner of the vehicle; and
wherein the dual mode method has an error rate of < 0.05%.
A system for assessing toll fees in a toll road system, the system comprising:
means for collecting sensor data of a vehicle having one or more axles as it travels on a lane through a toll point at a time and a date and determining a first axle count based on the sensor data;
means for collecting video images of the vehicle as it travels through the toll point and determining a second axle count based on the video images;
means for collecting i) still camera images or ii) RFID identity data from the vehicle as it travels through the toll point, or both i) and ii) and means for determining vehicle identity based on i), ii), or both i) and ii);
means for comparing the first axle count and the second axle count and if identical, charging the vehicle based on the identical axle count;
means for optionally repeating the video analysis and comparing steps until the first axle count and the second axle count are identical, but if identity is not reached flagging the transaction record for human intervention.
In one embodiment, the sensor data is obtained from road embedded electromagnetic loop sensors, or road embedded pressure sensors or laser scanning sensors.
In one embodiment, the vehicle identity data from still camera images and RFID identity data are compared and if not identical, the transaction record is flagged for human intervention.
In one embodiment, the machine learning uses a deep learning algorithm or deep learning reinforcement algorithm.
In one embodiment, the method or system further comprises generating a monthly summary of charges to the vehicle and sending the monthly summary to an owner of the vehicle and/or means for same.
In one embodiment, the method or system has (or produces) at least 100 fold fewer errors in axle count than a video system alone or a sensor data system alone.
In one embodiment, the video analyzing step includes determining an expected frame timestamp when the vehicle should be in clear view based on vehicle speed, vehicle length, and distance between a video camera and the vehicle, and using a video image from the expected frame timestamp to determine the second axle count.
In one embodiment, wherein both still camera images and RFID identity data are collected and compared to confirm that the RFID tag is present on the vehicle for which it is registered, and flagging the transaction record for human intervention if the RFID tag is present on a vehicle for which it is not registered.
In one embodiment, where the machine learning uses a deep reinforcement learning algorithm.
In one embodiment, wherein the transaction record is transmitted to another computer system for the video analyzing. For example, the data can be transferred from the toll booth to a centralized computer system, and/or databases before uploading to the centralized computer system.
In one embodiment, the still camera images are analyzed by optical character recognition to determine a license plate number and/or state of the vehicle.

As used herein, "axle count" refers to the number of axles on a vehicle, plus any device being pulled by the vehicle, that touch the roadway as it travels through the tolling point. From the side view of a vehicle, it's the number of wheels on the ground on that side. Some larger trucks and tractor trailers are capable of retracting axles, e.g., when not under load. Lift axles (aka drop axle or retractable axle) are not counted herein, unless deployed.

"Back office system" or "BOS" is an account management system for managing a toll road system. One example is the EZ TAG account management system in Harris county, Texas. This is the software system where transactions are sent from the roadway system for processing and posting to customer accounts.

"Business intelligence/data warehouse" or "BI/DW" is a database where data is stored and used for system processing and reporting. We have used the BI/DW by Oracle herein, but any database warehousing system can be used. For example, there are third party vendor systems by Amazon, Google, and the like, and an in-house system could also be used.

"Computer Vision" or "CV" is an interdisciplinary scientific field that deals with how computers can gain high-level understanding from digital images or videos. From the perspective of engineering, CV seeks to understand and automate tasks that the human visual system can do. CV uses artificial intelligence to learn from its visual inputs to understand and interpret the data to identify and classify objects. Visual inputs can be digital images from sources such as pictures, video feeds, etc.

"Electronic loops" or "electromagnetic loops," also referred to as just "loops" or "loop sensors." These are spools of wire embedded into the roadway that, when powered, generate an electromagnetic field. When a vehicle passes through the electromagnetic field the metal in the vehicle's tires cause interference in the electric current. These perturbations are used by a roadway system to identify and count axles on a vehicle.

"Laser scanners" refers to technology that uses a fan of laser beams that indicate the dimensions of a vehicle as it passes through the toll point. The data is interpreted by the roadway system into defined parameters that are used to determine the price of the toll.

"Machine learning" is an application of artificial intelligence that provides systems the ability to automatically learn and improve from experience without being explicitly programmed for the task. There are a great many machine learning algorithms (see Table 1), and more continue to be developed. Any such algorithms may be used, but we have used distributed neural networks and deep learning, and may use deep reinforcement learning in the next iteration.

TABLE 1

| Machine Learning Algorithms | |
| --- | --- |
| Adagrad | Logic learning machine |
| Algorithms of Oppression | LogitBoost |
| Almeida-Pineda recurrent backpropagation | Loss functions for classification |
| Backpropagation | Manifold alignment |
| Bioz | Minimum redundancy feature selection |
| Bootstrap aggregating | Mixture of experts |
| CN2 algorithm | Multiple kernel learning |
| Constructing skill trees | Non-negative matrix factorization |
| Deep reinforcement learning | Online machine learning |
| Dehaene-Changeux model | Out-of-bag error |
| Diffusion map | Prefrontal cortex basal ganglia working memory |
| Dominance-based rough set approach | Prototype methods |
| Dynamic time warping | PVLV |
| Elastic net regularization | Q-learning |
| Error-driven learning | Quadratic unconstrained binary optimization |
| Evolutionary multimodal optimization | Query-level feature |
| Expectation-maximization algorithm | Quickprop |
| Extremal Ensemble Learning | Radial basis function network |
| FastICA | Randomized weighted majority algorithm |
| Forward-backward algorithm | Repeated incremental pruning to produce error reduction (RIPPER) |
| GeneRec | |
| Genetic Algorithm for Rule Set Production | Rprop |
| Growing self-organizing map | Rule-based machine learning |
| Hyper basis function network | Skill chaining |
| IDistance | Sparse PCA |
| K-nearest neighbors' algorithm | State-action-reward-state-action |
| Kernel methods for vector output | User: Tsbertalan/Reinforcement Learning |
| Kernel principal component analysis | Stochastic gradient descent |
| Label propagation algorithm | Structured kNN |
| Leabra | T-distributed stochastic neighbor embedding |
| Linde-Buzo-Gray algorithm | Triplet loss |
| Local outlier factor | Wake-sleep algorithm |
| | Weighted majority algorithm (machine learning) |
| | Zero-shot learning |

"OCR" or "optical character recognition" is the technology used by the roadway system to convert a picture of a vehicle's license plate into a string of characters for the license plate number and state. This information is used by the back office system to match a vehicle to a customer account for charging tolls.

"Orpix" is an exemplary computer vision software by Orpix Inc., that uses image-based data inputs to interpret and identify attributes of objects in the image (i.e. axles). The Orpix system uses machine learning technology to be trained for what the characteristics are in an image so it can adapt for various perspectives in the data it's processing. Other potentially useful computer vision software packages include Matrox, OpenVino by Intel, Appen, OpenCV, Matlab, AForge.NET/Accord.NET, TensorFlow, CUDA, SimpleCV, Inception, Resnet and GPUImage to name a few.

"RFID" or "radio frequency identification" refers to the use of electromagnetic fields to automatically identify and track tags attached to objects. An RFID tag consists of a tiny radio transponder; a radio receiver and transmitter. When triggered by an electromagnetic interrogation pulse from a nearby RFID reader device, the tag transmits digital data, usually an identifying inventory number, back to the reader. Herein we use RFID tags inside the EZ TAG transponder to communicate with the roadway system and uniquely identify the vehicle associated to a customer account for charging tolls.

"Roadway system" as used herein refers to an entire system of toll roads and the roadway toll collection system ("RTCS") that is used to collect data from vehicles as they pass through the toll points. The data is collected and passed to the back office system where it is processed and used to charge the tolls EZ TAG customer accounts. These roadway systems can be quite extensive. Harris county for example, has over 100 miles of toll road and processes more than a million transactions each day, with more toll roads planned for the future.

By "side angle" or "side angle video images," we refer to collecting pictures of the door side of any vehicle, from which angle the axles are clearly visible.

A "toll point" is a location in the tolling system where the roadway system's hardware and software equipment is installed to collect data from vehicles as they pass through. A "toll plaza" on a roadway typically includes a plurality of lanes, each capable of obtaining toll data, but exit toll points may have only a single lane. In some cases, but not all, the toll point or toll plaza is also accompanied by one or more toll booths which may be staffed to provide change and the like. However, the modern drive is to have entirely electronic toll systems, such as the Westpark tollway in Harris county, which has no booths and requires an EZ tag to use.

A "transaction" refers to an event that is created by the roadway system that identifies attributes (e.g., axles, location, date, time, vehicle identification) of a vehicle that has passed through a toll point. The data is used in the back office system to determine the price of a toll and the account owner that will be charged for that use of the tollway.

A "transaction record" aka "interval file" includes all of the data that is generated for each transaction, including e.g., time, date, plaza ID, lane ID, vehicle ID and customer number, video and camera images, axle count, license plate state, license plate number and OCR values.

A "transponder"—for example the EZ TAG REID transponder—is attached to a vehicle and communicates to the roadway system as the vehicle passes through a toll point and its unique identifier is included in the transaction record. During processing, the transponder ID is linked to a customer account in the back office system where the toll charge will be posted.

As used herein, any reference to a "vehicle" includes any motorized wheeled means of transportation, including any object being towed therebehind. A truck may have two axles by itself, but have three or four with a small trailer in tow, and larger trucks may have several axles in use at any one time. Further, axles in use may vary as some may be lifted during light loads to save energy and wear and tear on tires.

The following abbreviations may be used herein:

| Abbreviation | Expansion |
| --- | --- |
| API | Application programming interface, herein we used the Orpix API |
| BI | Business Intelligence, herein we used Oracle Business Intelligence Enterprise Edition |
| BI/DW | Business intelligence/data warehouse |
| BOS | Back office system |
| BOS LaneID | the lane identification number in BOS |
| BOS PlazID | Plaza or toll point identification number in BOS |
| CV | Computer Vision |
| DB | Database |
| GPU | Graphics Processing Unit |
| ID | Identification |
| JMS | Java Message Service |
| JSON | Java Script Object Notation |
| LAA | Lane Audit Application, propriety software developed by HCTRA |
| LAA Transaction Intake Queue | The queue that takes in transactions from BI and sends it to LAA |
| MVP | Minimum Viable Product |
| OCR | Optical Character Recognition |
| ORT | Open Road Tolling |
| RFID | Radio Frequency Identification |
| RT | Transaction time from the Back Office System |
| RTCS | Roadway toll collection system |
| SQL | Structured query language |
| UFM | Universal financial message |
| UTC | Universal coordinated time |
| VEH | Vehicle |

The use of the word "a" or "an" ~ when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as data storage, transfer of data from one system to another, collection of additional data, and the like. Any claim or claim element introduced with the open transition term "comprising," may also be narrowed to use the phrases "consisting essentially of" or "consisting of." However, the entirety of claim language is not repeated verbatim in the interest of brevity herein.

BRIEF DESCRIPTION OF THE DRAWINGS

FIG. 2A-B shows an exemplary transaction processing flow 200.

FIG. 5A-C shows an exemplary segmentation module 500 in more detail.

DETAILED DESCRIPTION

The disclosure provides a dual mode axle counting system for toll plazas that is more accurate than either single mode system used alone.

The dual mode system combines a machine learning computer vision analysis of video data with the existing toll systems, such as electromagnetic loops, pressure sensors, laser scanners, magnetic sensors, treadles and the like. When the axle counts from the two systems coincide, the customer is charged the toll fee, but in the event of discrepancy, the machine learning computer vision analysis is repeated and any errors are corrected, the system learning from its mistakes how to correctly classify wheels on the ground, and not lifted axles, side mount spare tires, and miscellaneous circles. Further, it learns to compensate for weather anomalies, by comparing its results with the sensor system results, and gradually improves its performance even in inclement weather. The system is expected to also learn to recognize bounces, where embedded sensor systems typically missed any axles that bounced over the sensor.

The computer vision machine learning system can be any such system on the market or to be developed, but we have used the Orpix Image & Video Analytics platform herein since it was originally developed to classify cars. Orpix combines both traditional image matching with state of the art deep learning, allowing the algorithms to complement each other in order to maximize performance and accuracy. Orpix is an application that provides all the necessary tools to annotate and analyze content in images and video. An application allows the user to define categories, upload images and videos, and run them through robust automatic detection. The user can then review the results, make adjustments as needed, and then upload and analyze training images. On the performance of reliability tests, parameters can be adjusted to manipulate speed and accuracy, and when the training and testing is completed, the system can be deployed.

Figure 1A:
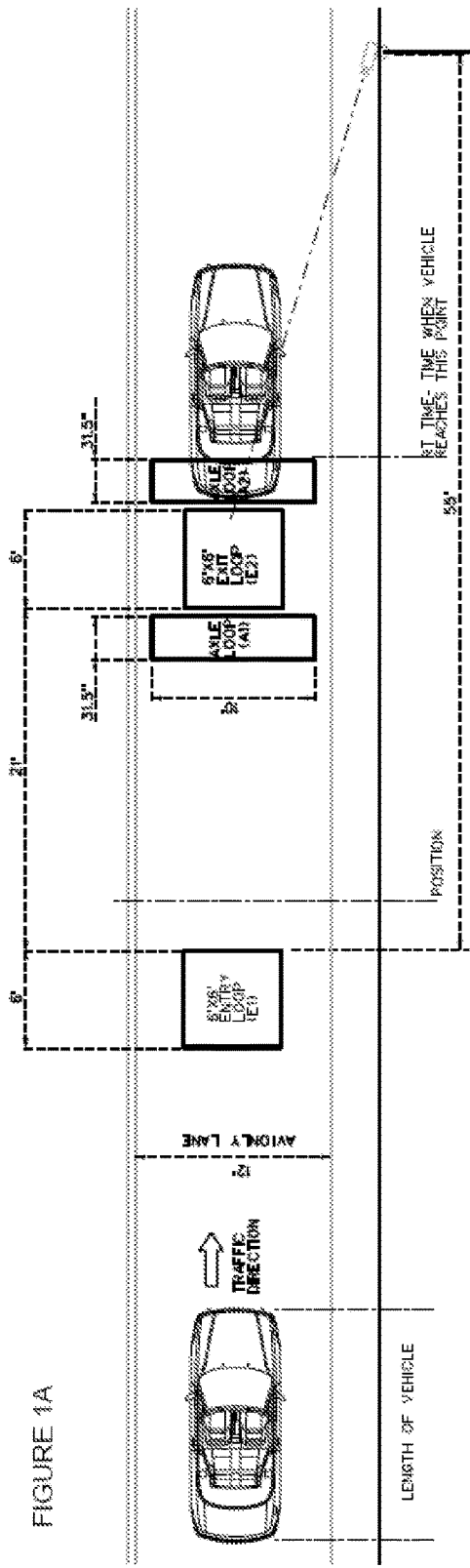
FIG. 1A Shows an exemplary layout and implementation for an electromagnetic loop system that counts axles-top plan view.
Figure 1B:
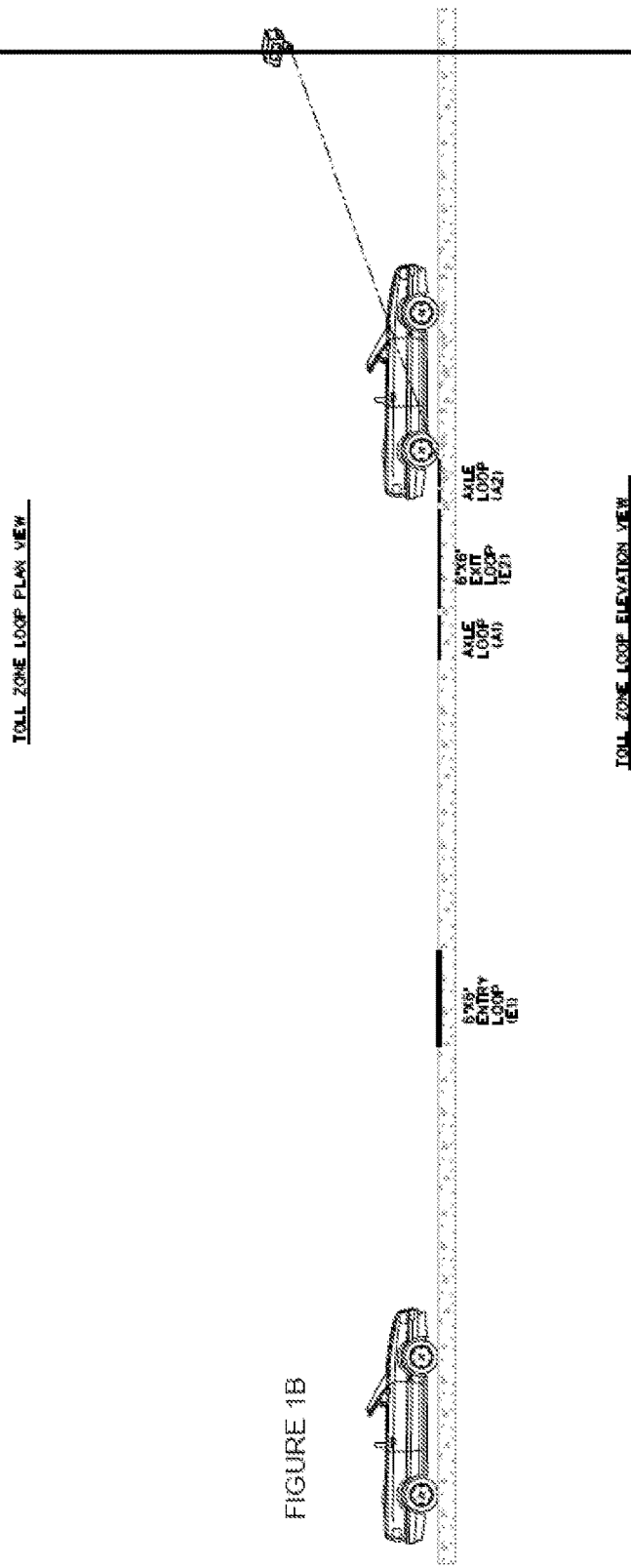
FIG. 1B shows a side view of the system of FIG. 1A.
Figure 2B:
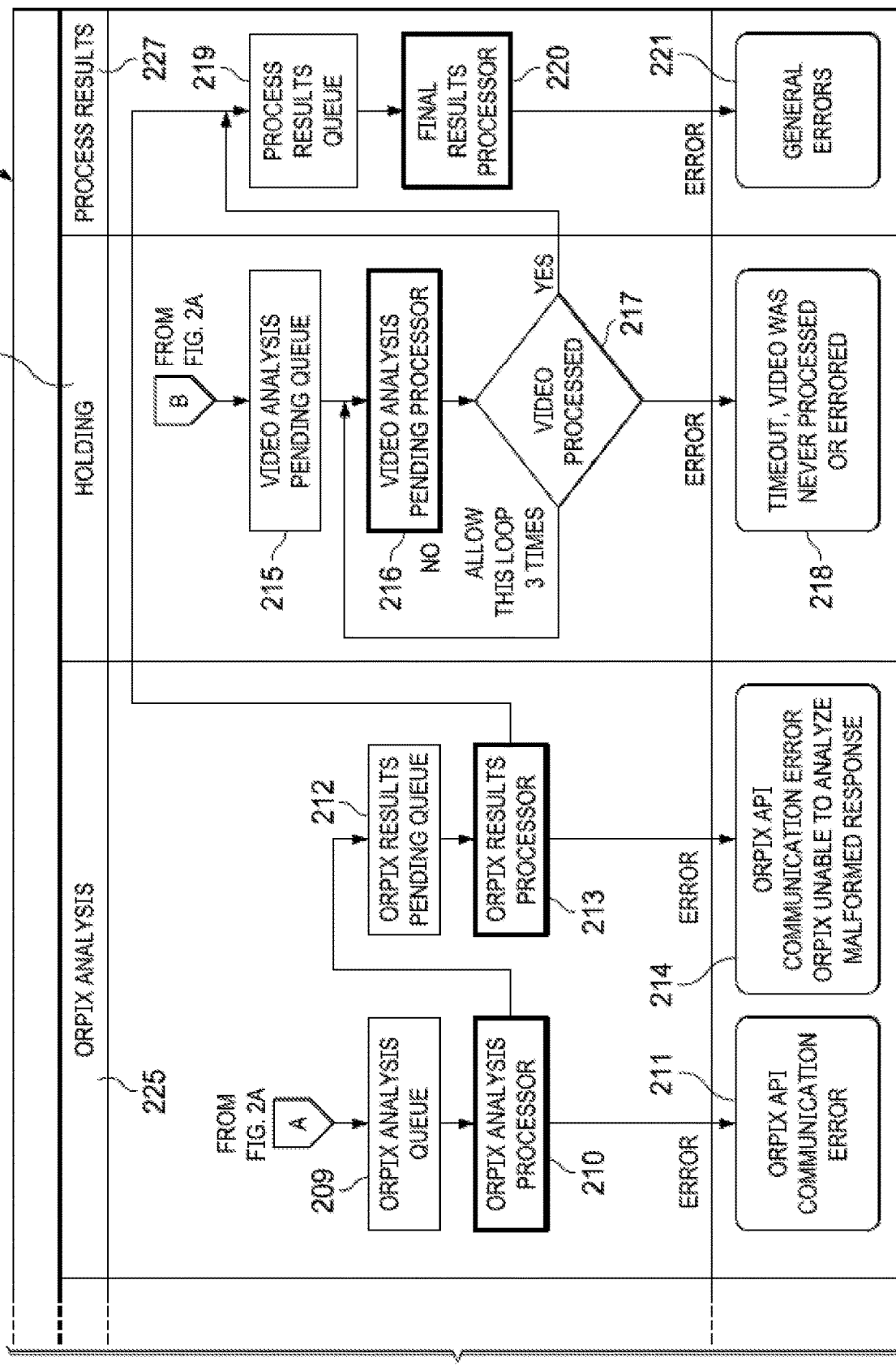

FIG. 2A-B shows an exemplary transaction processing flow 200 including for example 6 phases or modules that enable the dual mode e-toll system—loading 222, ingestion 223, segmentation 224, Orpix analysis 225, holding 226 and results 227. Loading is self-explanatory—it is that portion where transaction records are uploaded to the system. Ingestion is a process of taking the loaded transactions from 201 and comparing with a database to look for any errors with the data. This process also eliminates the transactions that occurred on non-HCTRA toll roads. Segmentation is the process of creating queues based on the user provided priorities and preferences. Orpix analysis is the stage where CV and machine leaning occur. Holding is a module to ensure that the data is held until all of the modules are synchronous (e.g., all parts are ready to complete the transaction record analysis). In the results module, the system finalizes the analysis and charges the customer, and e.g., provides billing records or transaction summaries.

In general, we have used java-based coding because it is a general-purpose programming language that is class-based, object-oriented, and designed to have as few implementation dependencies as possible. However, the language is not critical and other languages, such as Python, C Sharp, C++ and the like could be used.

In a first step, a transaction is loaded 201 to the system and then proceeds to the intake queue 202. The transaction ingestion processor 203 checks that the transaction record is complete and accurate. If so, the transaction record proceeds to the segmentation queue 205, but if not, an error message is received 204 and attributes an error code to indicate the cause of error being invalid transaction plaza, lane, or the primary lane camera not properly set up. Any of these issues would prevent the audit or analysis from completing successfully.

The segmentation processor 206 looks for the Orpix video record, and if found 208 proceeds to the next step to the Orpix analysis queue 209. If not found, the system sends the raw video file to video analysis pending queue 215.

In the Orpix analysis 225, the video record is sent from the Orpix analysis queue to the Orpix analysis processor 210. If the Orpix analysis processor completes the analysis, the results will be sent to the results pending queue 212 and then to results processor 213, and if the analysis is incomplete or cannot be completed, it will proceed to error message, such as Orpix API communication error 211. At the Orpix results processor 213 if the results satisfy all checks, they will be sent to the process results queue 219, and if the results do not pass all checks, an error message will indicate the error, such as Orpix API communication error or Orpix unable to analyze malformed response 214. When an error is detected it is cleared up manually.

Following the NO decision in 208, the raw video file is sent to a video analysis pending queue 215, where a video analysis pending processor 216 performs further video analysis until it determines either the video analysis is complete and then sends the results to the results queue 219; the results will further be processed by the final result processor 220. From there, if error still persists, the results will be designated "GENERAL ERRORS" at 221. At least three queries, but possibly more, are made by query 217 and an error message 218 is provided if the system times out.

If the segmentation processor 206 does not find the raw video or the x, y coordinates are not specified, an error message 207 is provided and the end user is notified that process has ended.

Figure 3:
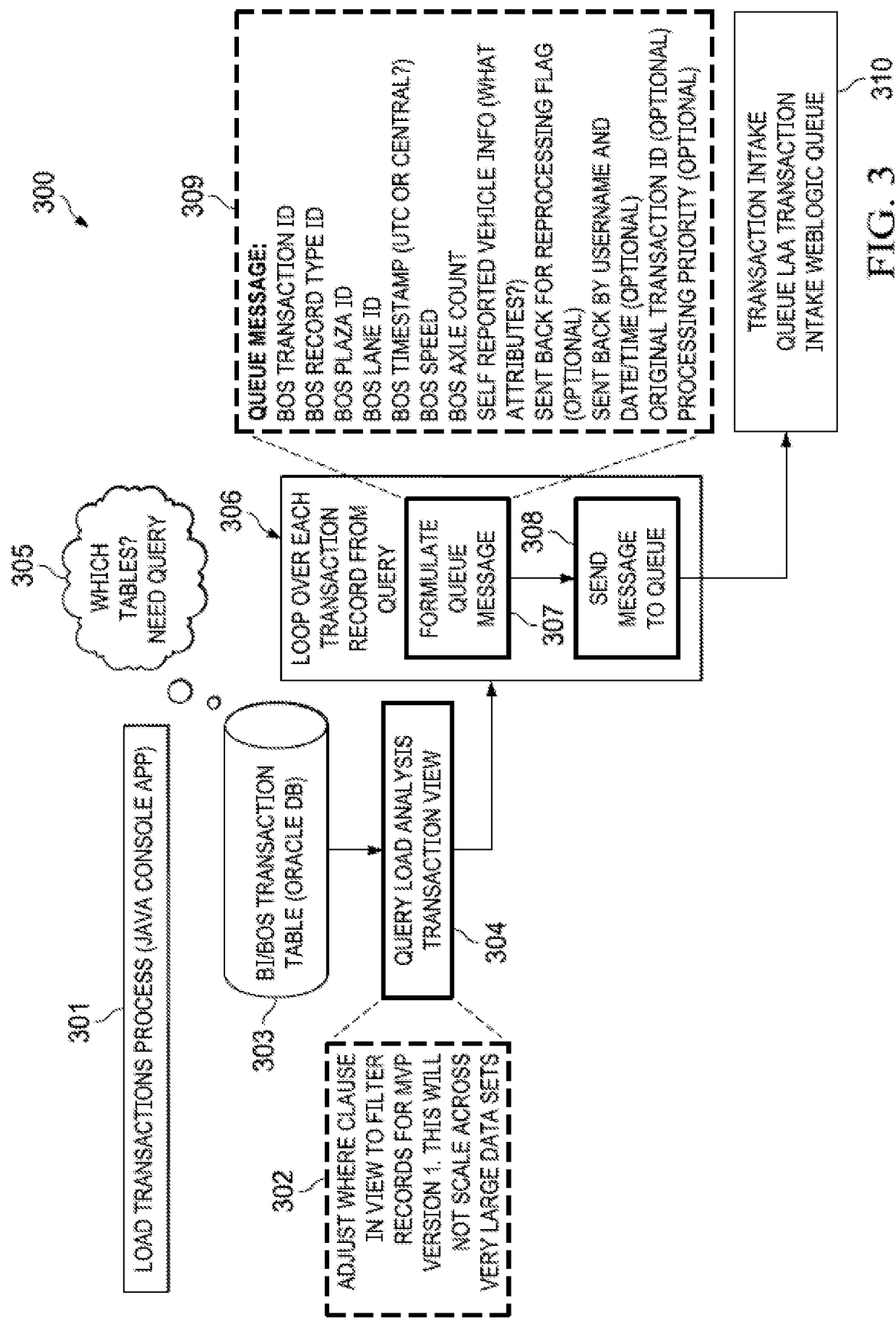
FIG. 3 shows an exemplary intake module 300 in more detail.

FIG. 3 300 shows the load transaction process 301 in more detail. Transaction records are stored in a database 303, here shown as being in tabular format. Each line in the table is queried 304 in a loop 306, and if needed, adjustments 302 are made to execute the WHERE clause to filter records. Queue messages are formulated 307 (see 309 for example of the data elements in the messages) and sent to the queue 308 and from there over to the transaction module beginning with transaction intake queue 310.

Figure 4A:
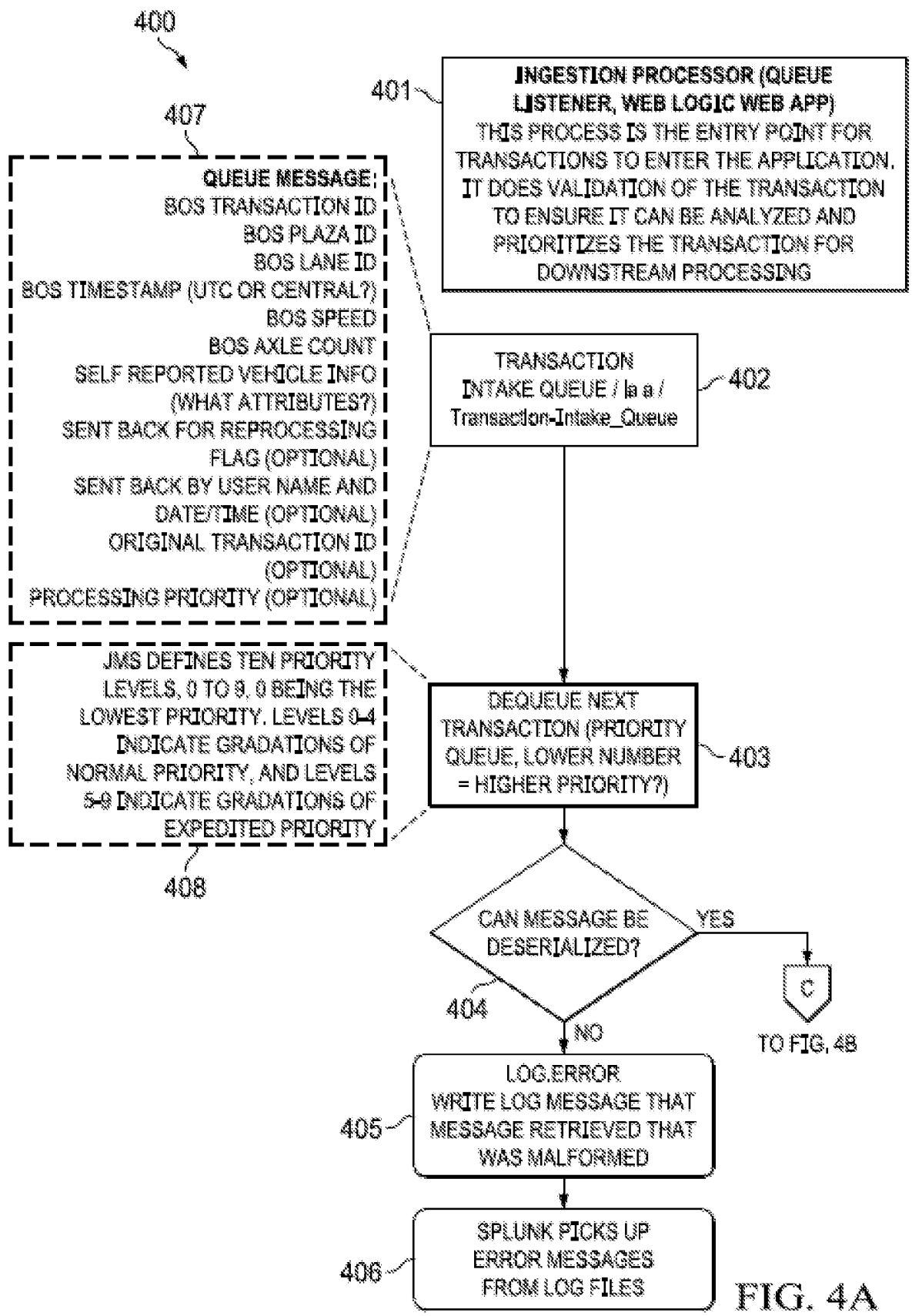
FIG. 4A-E shows an exemplary ingestion module 400 in more detail.

FIG. 4A-E shows the ingestion module 401 in more detail, which validates the transaction record and assigns its priority. In FIG. 4A, 402 is the transaction intake queue which can receive a variety of possible intake messages (see 407 for examples) and then sorts the intake according to priority 403. Query 404 determines if the message can be deserialized (taken out of sequence) and if so, proceed to FIG. 4B. If not, an error message 405 provides that the record was malformed in some way.

Splunk 406 picks up the error messages from the log files for further visualization. Splunk is a software mainly used for searching, monitoring, and examining machine-generated Big Data through a web-style interface, but other packages could be used. Splunk performs capturing, indexing and correlating the real-time data in a searchable container from which it can produce graphs, reports alerts, dashboards, visualizations, and provide meaningful insights into the log files.

Figure 4B:
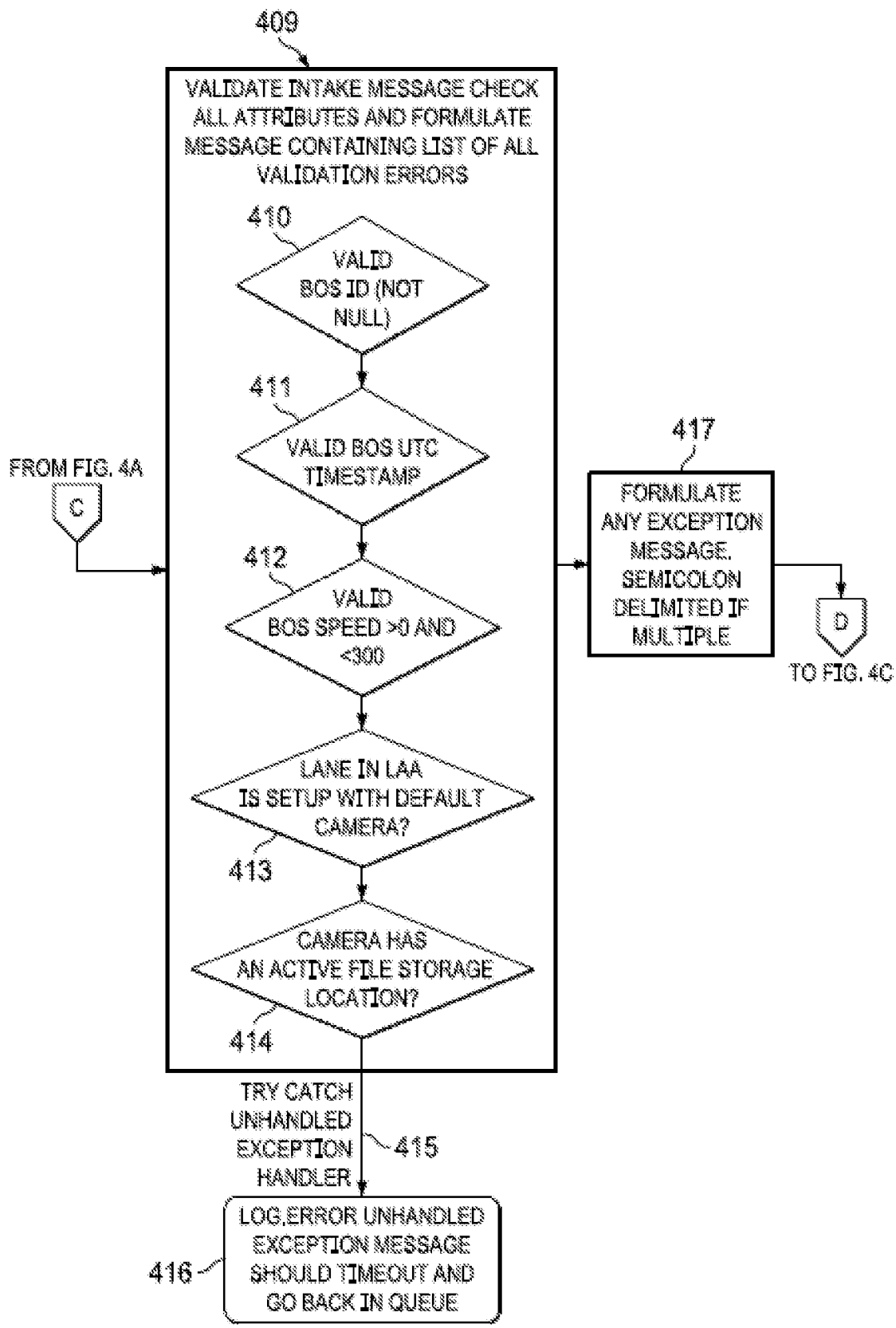

In FIG. 4B, validator 409 queries each transaction record for e.g., identification 410, timestamp 411, speed 412, camera presence or does the camera have default setup 413, existing video file 414, and the like. In 416, if there are anomalies, exception handler 415 sends a message timeout and the record goes back into the queue. If the transaction record passes the validator 409, known/handled exceptions are added 417 to the file, and the transaction record proceeds to FIG. 4C.

Figure 4C:
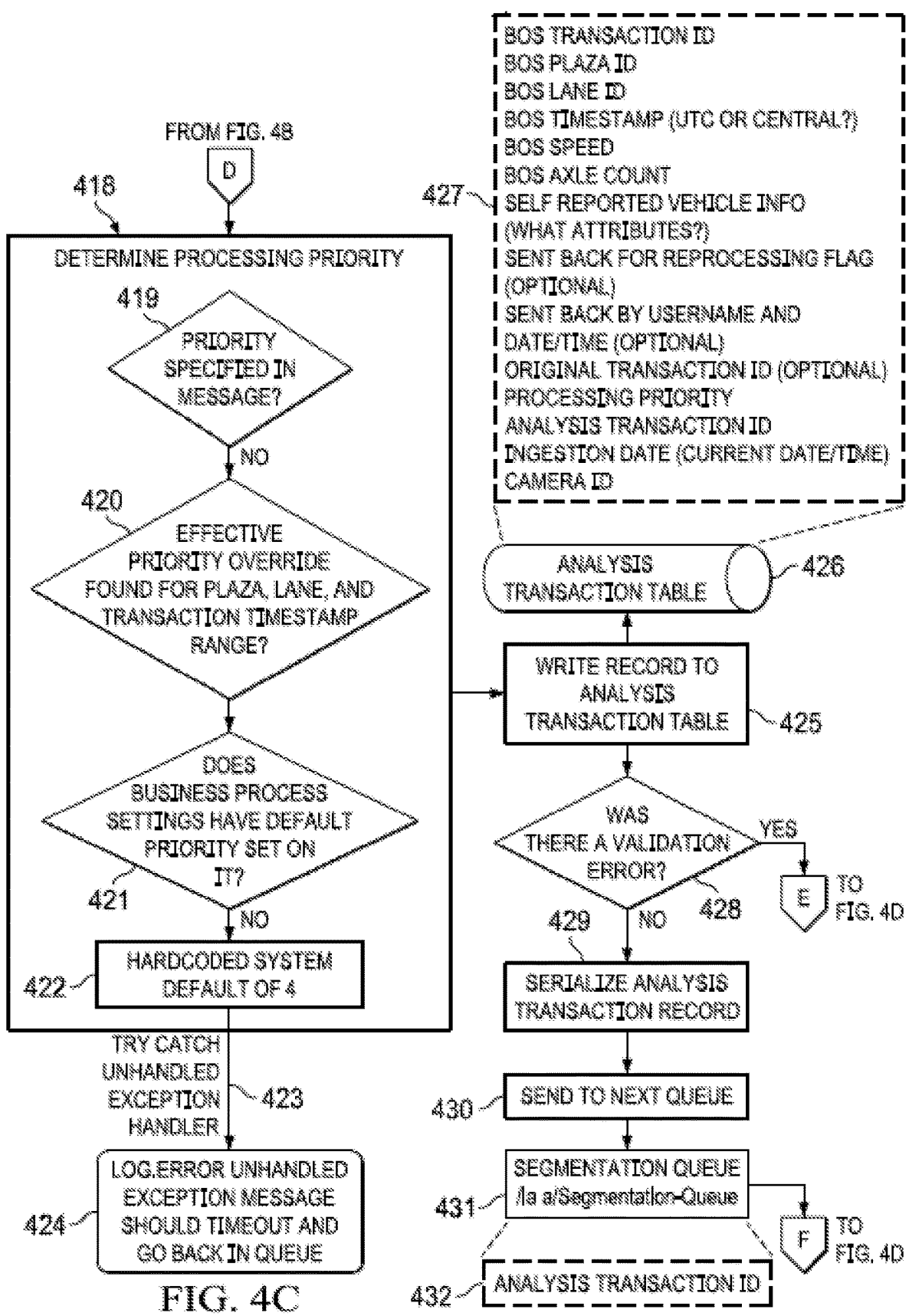

In FIG. 4C flow 418 determines processing priority for each transaction record. Query 419 asks if there is an assigned priority for the transaction record. If not, query 420 asks if there is an override in place for that plaza, lane or time. Query 421 asks if there is default priority established by business process settings. If none of the above provides a priority ranking, then a hardcoded to a medium priority (4) 422 is assigned. There are 9 processing priorities (1-9) that are used prioritize the video that needs to be analyzed by Orpix—9 being the top most priority and 1 being the lowest priority. However, these details can easily be modified.

As before, an unhandled exception handler 423 catches unhandled exceptions and provides an error readout 424 and sends the transaction record back to the queue. Once the priority is assigned, it is written 425 to the transaction table 426, which stores data, such as shown in 427.

Figure 4D:
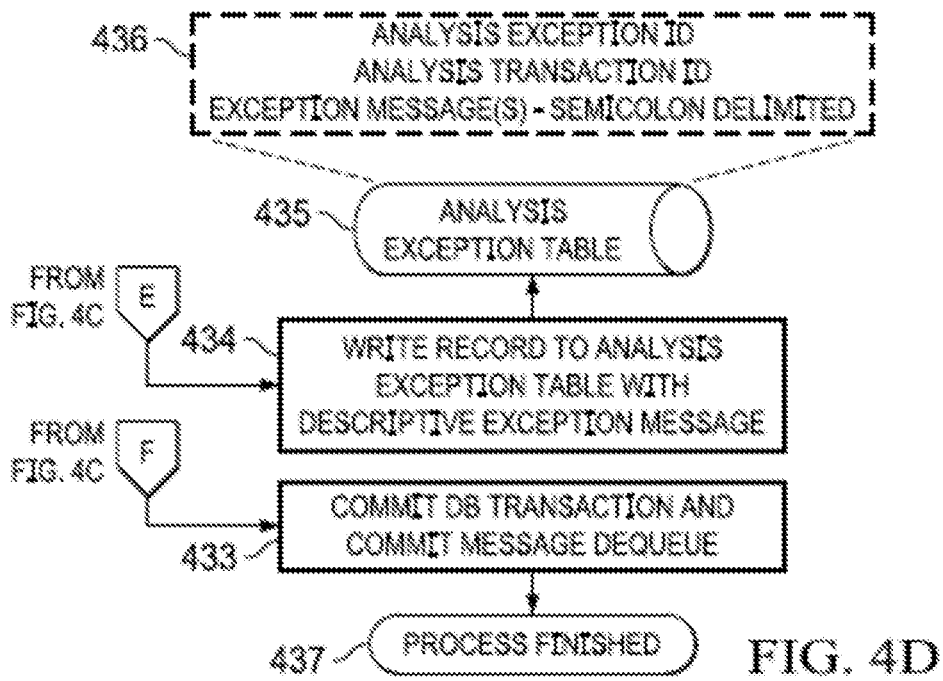

Query 428 asks if there was a validation error, and if yes, proceeds to box E in FIG. 4D where the transaction record is written 434 to the analysis exception table 435, with information such as seen in 436. If no validation errors are found, the transaction record is serialized 429 and sent to the next queue 430, which is the segmentation queue 431 and analysis of transaction record identification 432, then via box F to 423 committing to the database transaction and message dequeue and process finish 437 in FIG. 4D.

Figure 4E:
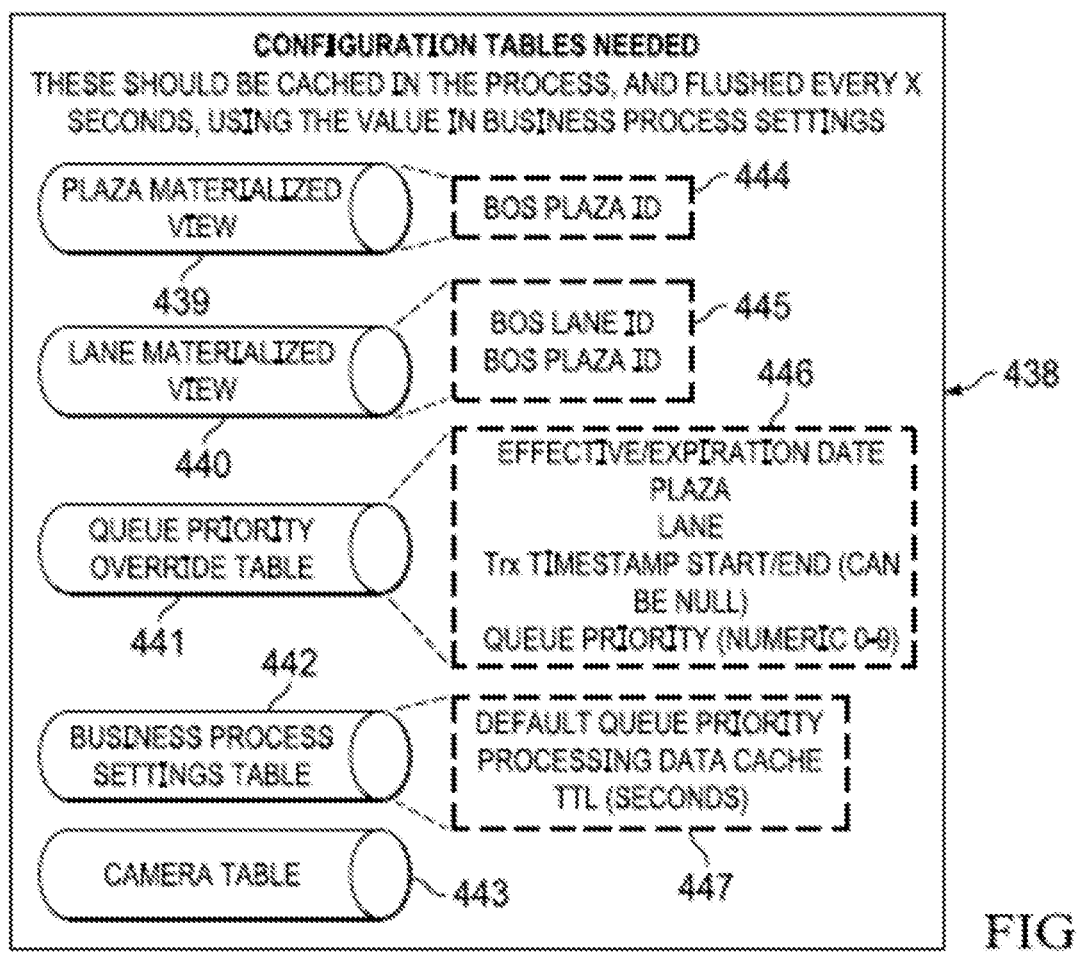

FIG. 4E shows the types of information carried in configuration tables to identify various attributes that form a transaction record, including plaza identification 439, lane identification 440, priority override table 441, business process settings 442 and camera table 443. These tables are queried as needed by the ingestion processor. Examples of each information being configured can be seen in 444, 445, 446 and 447. They are cached in the process, and flushed every x seconds, ensuring that most current information from those tables are presented to the transaction record. The business process data is refreshed on a periodic basis to account for configuration changes. As an example, it ensures that a closed lane does not take priority over a working lane.

Figure 5A:
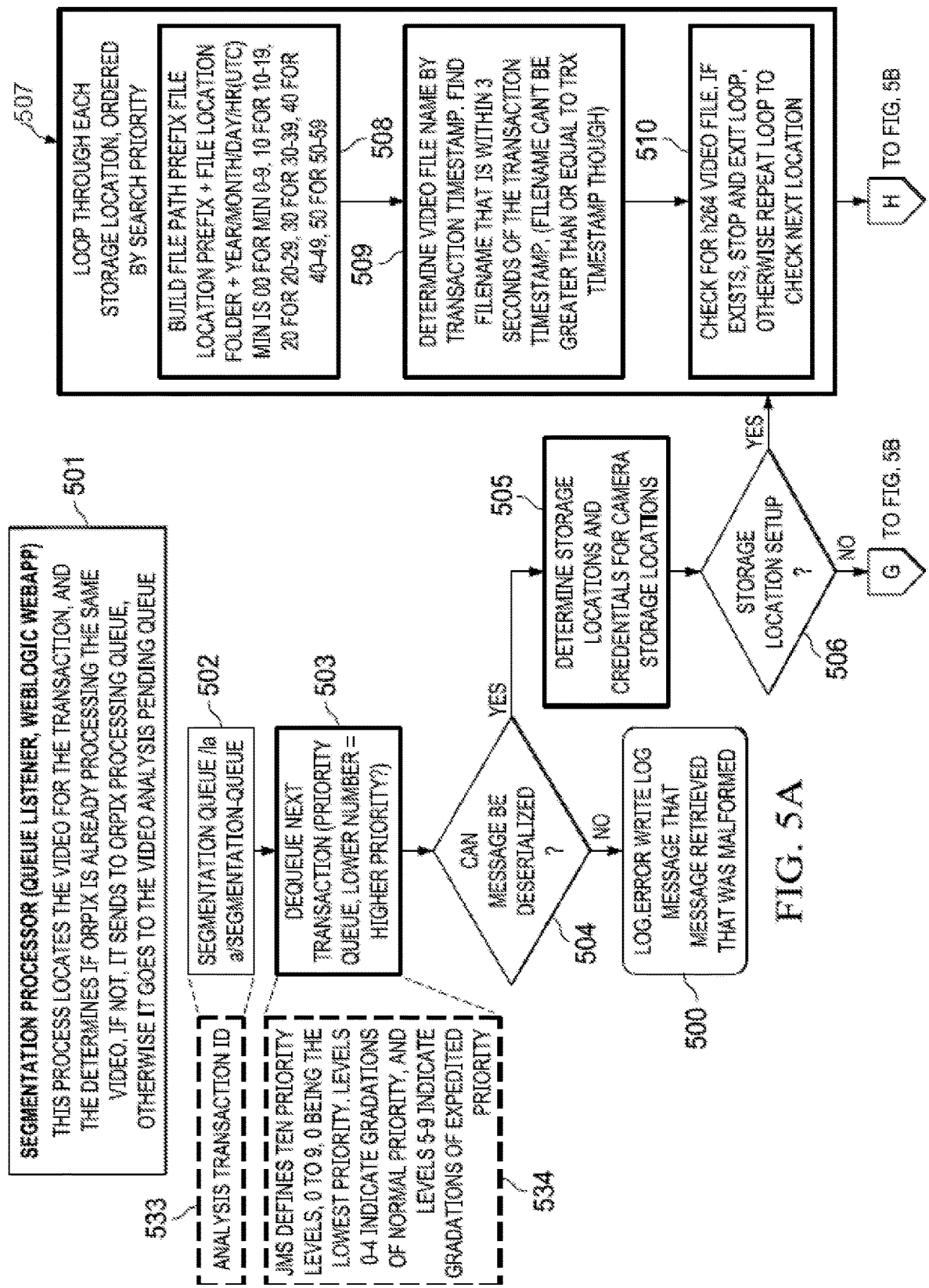
Figure 5B:
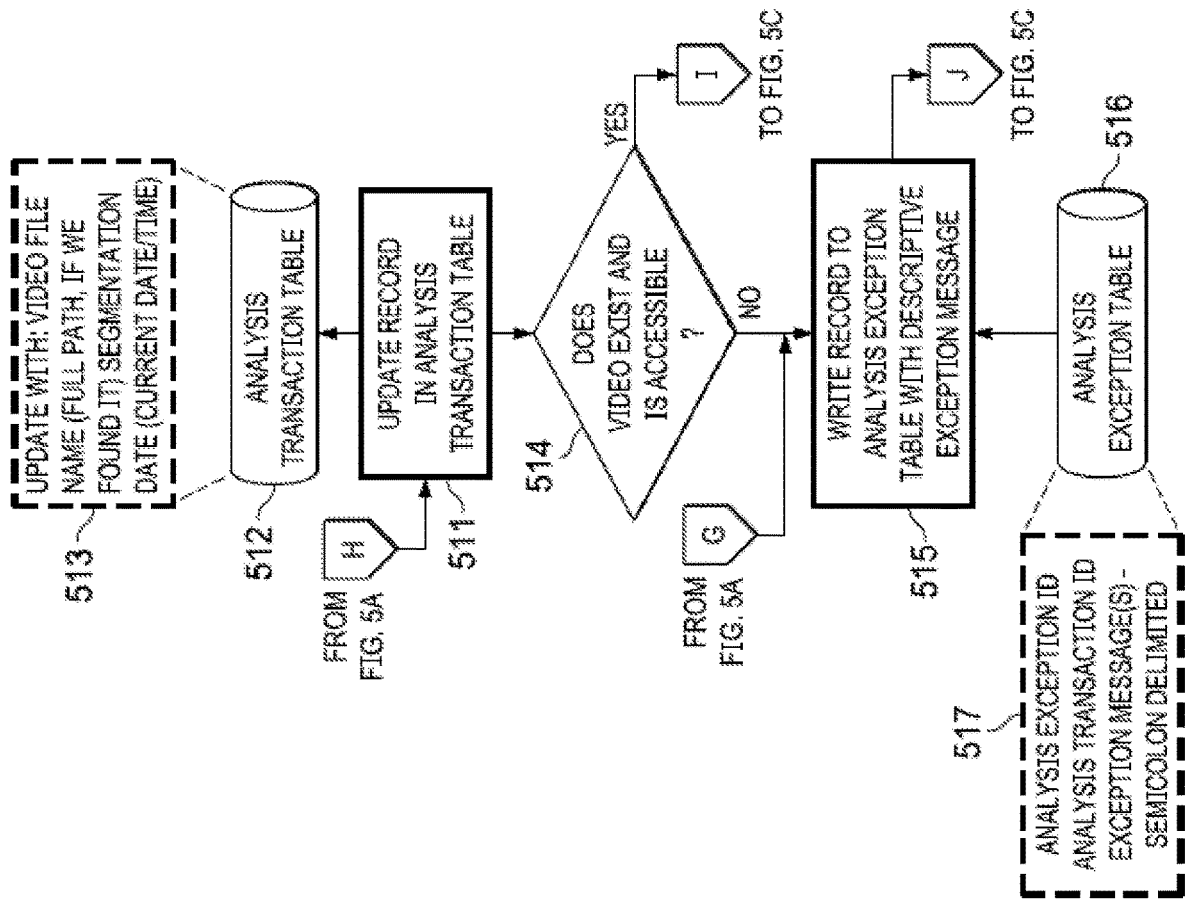

FIG. 5A-C shows the segmentation module 501 in more detail. In FIG. 5A, the transaction record is accepted into segmentation queue 502 and priority sorted in 503, where transaction records are moved back in the queue if a higher priority record is present. There may be up to 10,000 transactions in one queue at a time, the number is constrained by the hardware available to process the data. Query 504 asks if the message can be deserialized, and if yes, determines the location and credentials of camera data storage 505. If not, an error log 500 is created. 506 queries if that storage location is established and ready for use, and if so, loop 507 is entered, which builds a file path 508 for each video record, determines a video file name 509, and checks for a video file at that location 510. If a file is located, loop 507 is exited to FIG. 5B, if not the loop recurs. If, however, query 506 determined that no storage location is established, this is written (as continued in FIG. 5B) 515 to exception table 516, with information such as that provided in 517. If no video data is available, the sensor data may be used as the default or the record may be flagged for human intervention or both.

In FIG. 5B, if the loop 507 is successfully exited, the updated record is written 511 to analysis transaction table 512, with data such as is shown in 513, including e.g., video file name and segmentation date. If query 514 established that the video exists and is accessible, proceed to FIG. 5C. If not, the system proceeds to record the exception at 515, 516, as already described.

In FIG. 5C, if query 514 established that the video exists and is accessible, the transaction record enters loop 520 which determines whether or not the Orpix video analysis is consistent with other sensor data and if not whether it should be reanalyzed. Query 522 asks if the video analysis has arrived to the results table 521 in the last 4 hours. If yes, the latest Orpix result record is obtained and query 523 asks if the status is errored. If no error, it is written 525 to the Orpix results table 521, and exits to serialization of the record 525, and Orpix analysis queue 526, 537. If an error is detected, the transaction record exits the loop and cycles again through the video analysis pending queue 528, 529, 530.

The system was built as described above, and then the CV system trained to correctly count axles. We trained the Orpix on 2000 video files and compared them with electromagnetic loop data. The following is a process of training the computer vision system:

1) Create a database of individual images of each axle type, include images that have raised axle and dual tires.
2) Label or annotate each image with the right axle type.
3) Process these images through the CV system.
4) Validate that the CV system has correctly classified each vehicle axle type.
5) Calculate a percentage error for each axle type.
6) Set a threshold for accuracy for each axle type, such as 99.90% for 2 axle and so forth.
7) Get a set of new images and run these test images thru the CV system.
8) If the new images meet the threshold for accuracy for each axle type, use the system weights for the production model and proceed to deployment.

Before deployment, lane audits were performed to determine error rates of the system—how frequently the system incorrectly determined axle count. No additional prep work was required as the equipment that was already installed on the lanes were used. Over 225,000 transactions were processed to this system and using the dual system an accuracy of 99.9928% (0.0072% error rate). By contrast, our electromagnetic loop system had an overall error rate of 5% and the video system has a 1.5% error rate. Thus, combining the two systems provided tremendous synergy, and the dual system was much improved over either system alone.

Issues encountered in our tests were typically poor quality images and vehicle travelling too fast so the vehicle did not show up clearly in the image. These problems can be mitigated by better lighting at night and have camera's record continuous motion (our current video cameras only record on motion) or by slowing traffic or a combination thereof.

Figure 6A:
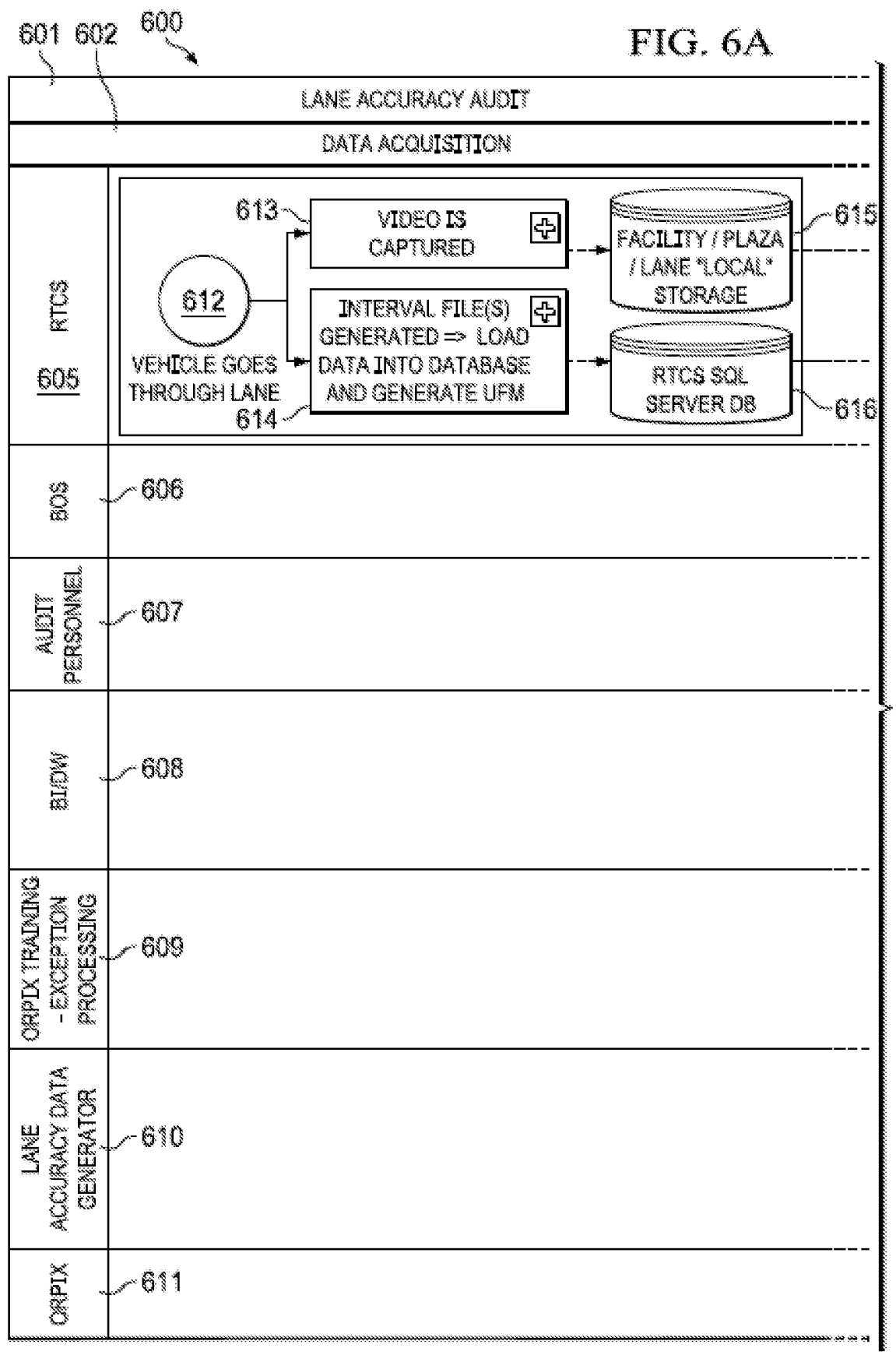
FIG. 6A-C shows an exemplary lane audit sequence diagram 600. The work flow is similar to that shown in FIG. 2, but includes lane audit details.
Figure 6B:
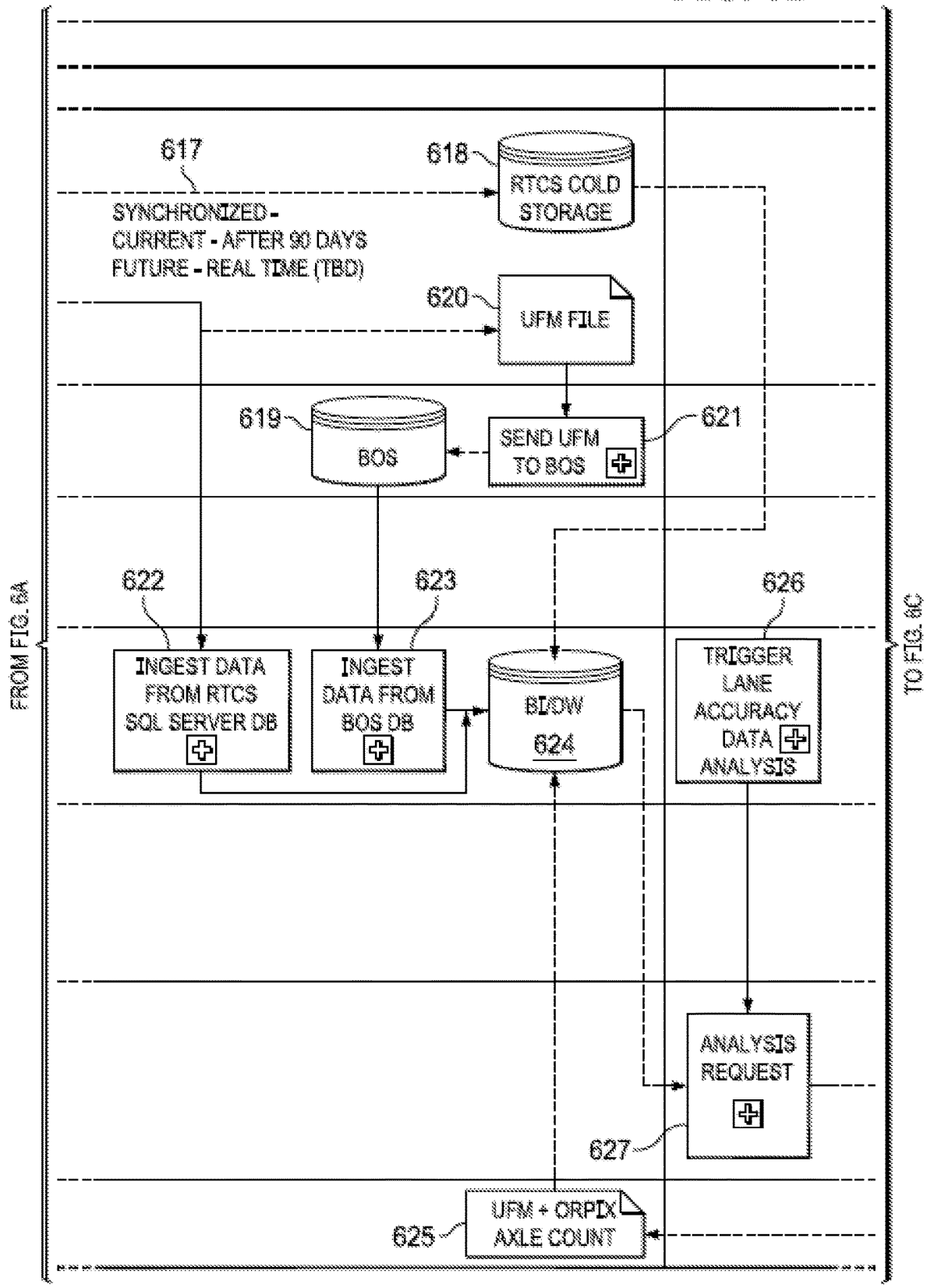
Figure 6C:
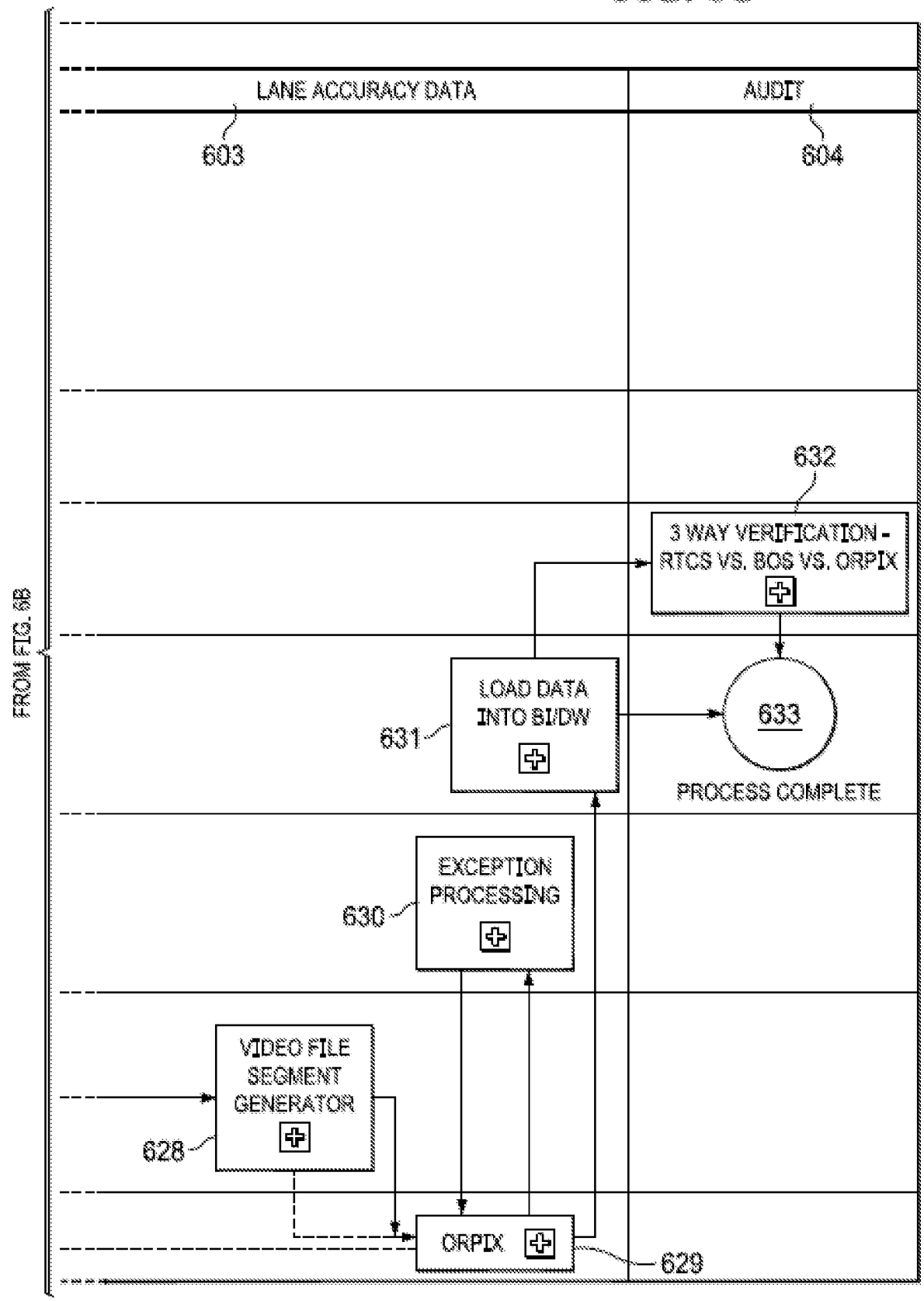

FIG. 6A-C shows an exemplary lane accuracy audit 601. The left hand axis in FIG. 6A describes the various stages, including roadway toll collection system ("RTCS") 605, back office system ("BOS")606, audit personnel 607, business intelligence data warehouse ("BI/DW") 608, Orpix training and exception handling 609, lane accuracy data generator 610, which checks accuracy by comparison against the original sensor loop data as well as BOS data, and Orpix 611 (while ORPIX is currently at the bottom in this workflow, it is planned to move it up in the queue once approval to make the change is obtained).

In the test, a vehicle travels through the test lane 612, its video being captured 613, and sent to local storage 615. At the same time, interval files (aka transaction records) are generated and loaded into a database in 614. This essentially creates a human readable form of the transaction record, including financial information, such as suggested toll charge. This is then send to a database server 616.

In FIG. 6B, at 617 the video data is copied from the local storage and sent to RTSC cold storage 618 and thence to the business intelligence data warehouse (BI/DW)624. The UFM file 620 is sent 621 from the server database 616 to the BOS 619 and ingested at 623. The same data is ingested directly from the server database 616 at 622. This allows the original data to be compared against the data that arrived at the BOS, which provides a level of error correction in case data is dropped as it is sent to BOS. Both data sets 622 and 623 proceed to the BI/DW 624 and a request 627 is initiated and proceeds with video file segment generator 628, Orpix analysis at 629 and exception processing 630. Once the axle is counted by Orpix analysis 629, that information is also sent to the BI/DW624, and can be included in the lane accuracy analysis, triggered at 626.

As shown in FIG. 6C, the Orpix analysis at 629 is further sent to load data into BI/DW 631, which will send the data into a 3-way verification at 632. Once all data is collected, the 3-way verification system initiates at 632, which compares the original sensor data against the data received at BOS and the data obtained by Orpix analysis. If there is a discrepancy between the original and BOS copies of the sensor data, the system can reload the BOS data again, correcting that error. If there is a discrepancy between the BOS and Orpix data, the video analysis is repeated. If reconciliation is not achieved after e.g., 2-3 tries, a human operator reviews the records and makes any needed correction. Most of this correction occurs during the training period, and far fewer corrections are made once deployed. Otherwise, the process is complete at 633.

Figure 7A:
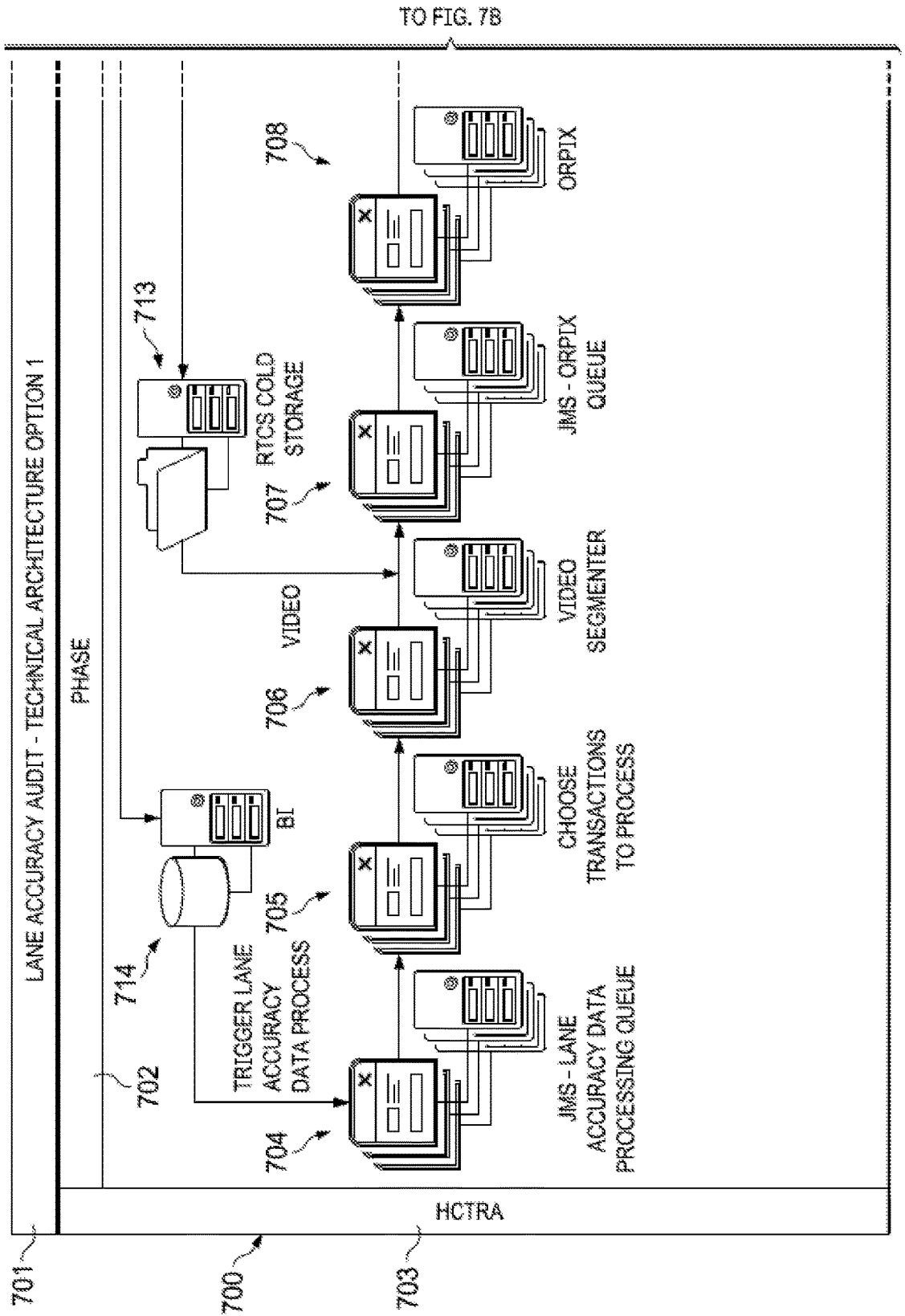
FIG. 7A-B shows an alternative architecture for a lane audit module 700.
Figure 7B:
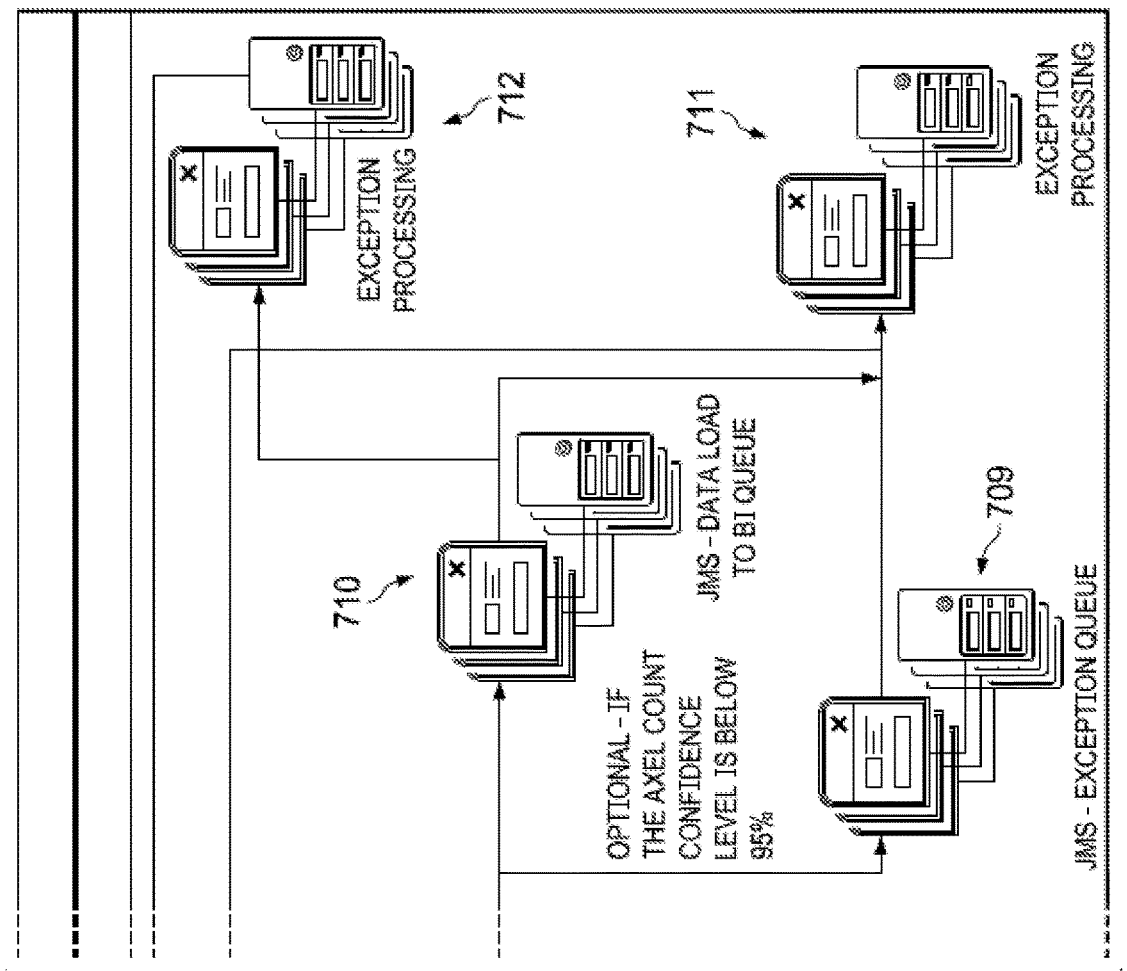

The above architectures are exemplary only and other process flows may achieve the same results. FIG. 7A-B, for example, shows an alternate architecture 701 for a lane audit. In this figure, data collection is omitted for simplicity and we begin with the BI/DW at 714 and trigger an accuracy analysis beginning with the lane accuracy processing queue 704, priority sorting at 705, and video segmentation at 706. Raw data comes from cold storage 713 and the data goes into the Orpix queue 707, and is then video analyzed 708. Data loads to the BI/DW queue 710. The exception queues at 711 and 712 are for audit exceptions when the 3-way verification fails (i.e. axle counts don't match). If the comparison between the sensor data and video data shows less than 95% confidence, the data can proceed to another exception queue 709, and processing 710, and cycle back through for a repeat analysis.

While conventional hardware can be used to run the method, the method can greatly benefit from increased compute power to speed analysis, and we have used CPU—Intel® Xeon® Silver 4112 CPU @ 2.60 GHz with memory of 16 GB, with GPU—NVIDIA Quadro RTX 5000 16 GB. Computer Vision solutions are dependent on the GPU capability in processing videos, and the current hardware can process around 10,000 videos. Other powerful GPUs could be used, such as Nvidia GeForce RTX 2080 Ti, the NVIDIA TITAN V with 12 GB HBM2 memory and 640 Tensor Cores, AMD Radeon RX 5700, Zotac GeForce GTX 1080 Ti Mini, PNY Quadro RTX 8000 Graphic Card and the like.

Although specific advantages have been enumerated above, various embodiments may include some, none, or all of the enumerated advantages. Other technical advantages may become readily apparent to one of ordinary skill in the art after review of the figures and description.

It should be understood at the outset that, although exemplary embodiments are illustrated in the figures and described above, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

The appended claims or claim elements are not intended to invoke 35 U.S.C. 112(f) unless the words "means for" or "step for" are expressly recited in the particular claim.

Each of the following references is incorporated by reference in its entirety for all purposes.

CN105069472 Vehicle detection method based on convolutional neural networks
CN105590102 Front car face identification method based on deep learning
CN105975941 Multidirectional vehicle model detection recognition system based on deep learning
US20070208681 Vehicle Data Collection and Processing System
US20170293808 Vision-based rain detection using deep learning
U.S. Pat. No. 5,448,484 Neural network-based vehicle detection system and method
U.S. Pat. No. 7,136,828 Intelligent vehicle identification system
U.S. Pat. No. 9,305,214 Systems and methods for real-time horizon detection in images
WO2015192239 Machine learning platform for performing large scale data analytics

What is claimed is:

1. A method of assessing a toll fee at a toll point in a toll road system, said method comprising:
   a) collecting sensor data of a vehicle having one or more axles as it travels on a lane through a toll point at a time and a date and determining a first axle count based on said sensor data;
   b) collecting video images of said vehicle as it travels through said toll point;
   c) collecting i) still camera images or ii) RFID identity data from said vehicle as it travels through said toll point, or collecting both i) and ii);
   d) determining vehicle identity based on c;
   e) creating a transaction record in a computer system comprising said video images or still camera images or both, said sensor data, said date, said time, identity of said lane, identity of said toll point, vehicle identity, and said first axle count;
   f) analyzing said video images using computer vision and machine learning to determine a second axle count based on said video images;
   g) comparing said first axle count and said second axle count and if identical, charging said vehicle based on said identical axle count; but if not identical, re-analyzing said video images to determine a revised second axle count;
   h) optionally repeating steps f and g until said first axle count and said revised second axle count are identical, and if identity is not reached then flagging said transaction record for human intervention.

2. The method of claim 1, wherein said sensor data is obtained from road embedded electromagnetic loop sensors.

3. The method of claim 1, wherein said sensor data is obtained from road embedded pressure sensors.

4. The method of claim 1, wherein said sensor data is obtained from laser scanning sensors.

5. The method of claim 1, wherein vehicle identity data from still camera images and RFID identity data are compared and if not identical then flagging said transaction record for human intervention.

6. The method of claim 1, wherein said machine learning uses a deep learning algorithm.

7. The method of claim 1, further comprising generating a monthly summary of charges to said vehicle and sending said monthly summary to an owner of said vehicle.

8. The method of claim 1, wherein said system has at least 100 fold fewer errors in axle count than a video system alone or a sensor data system alone.

9. The method of claim 1, wherein said analyzing step f includes determining an expected frame timestamp when the vehicle should be in clear view based on vehicle speed, vehicle length, and distance between a video camera and said vehicle, and using a video image from said expected frame timestamp to determine said second axle count.

10. The method of claim 1, wherein in step c both still camera images and RFID identity data are collected and compared to confirm that the RFID tag is present on the vehicle for which it is registered, and flagging said transaction record for human intervention if said RFID tag is present on a vehicle for which it is not registered.

11. A dual mode method of assessing a toll fee at a toll point in a toll road system, said dual mode method comprising:
  a) collecting electromagnetic loop sensor data of a vehicle as it travels on a lane through a toll point at a time and a date and determining a first axle count based on said sensor data;
  b) collecting side angle video images of said vehicle as it travels through said toll point;
  c) collecting overhead still camera images of said vehicle as it travels through said toll point;
  d) collecting RFID identity data from said vehicle as it travels through said toll point if said vehicle has an RFID tag;
  e) determining vehicle identity based on c or d or both e and d;
  f) creating a transaction record in a computer system comprising copies or links to said sensor data, said video images, and said still camera images, said date, said time, identity of said lane, identity of said toll point, vehicle identity, and said first axle count;
  g) analyzing said video images using computer vision and machine learning to determine a second axle count based on said video images;
  h) comparing said first axle count and said second axle count;
  i) repeating step g and h until said first axle count and said second axle count are identical; and
  j) charging said vehicle a toll based on said identical axle count;
  k) generating a monthly summary of charges to said vehicle and sending said monthly summary to an owner of said vehicle; and
  l) wherein said dual mode method has an error rate of <0.05%.

12. The method of claim 11, wherein vehicle identity data from steps c and d are compared and if not identical, flagging said transaction record for human intervention.

13. The method of claim 11, wherein said machine learning in step g uses a deep reinforcement learning algorithm.

14. The method of claim 11, wherein said analyzing step g includes determining an expected frame timestamp when the vehicle should be in clear view based on vehicle speed, vehicle length, and distance between a video camera and said vehicle, and using a video image from said expected frame timestamp to determine said second axle count.

15. The method of claim 11, wherein said transaction record is transmitted to another computer system for said analyzing step g.

16. The method of claim 11, wherein said still camera images are analyzed by optical character recognition to determine a license plate number of said vehicle.

17. The method of claim 11, further comprising comparing said still camera images and said RFID identity data to confirm that the RFID tag is present on the vehicle for which it is registered, and flagging said transaction record for human intervention if said RFID tag is present on a vehicle for which it is not registered.

18. The method of claim 11, wherein said still camera images are analyzed by optical character recognition to determine a license plate number of said vehicle and comparing said license plate number and said RFID identity data to confirm that the RFID tag is present on the vehicle for which it is registered, and flagging said transaction record for human intervention if said RFID tag is present on a vehicle for which it is not registered.

19. The method of claim 11, wherein said machine learning uses a deep learning algorithm or deep learning reinforcement algorithm.

20. A system for assessing toll fees in a toll road system, said system comprising:
  a) means for collecting sensor data of a vehicle having one or more axles as it travels on a lane through a toll point at a time and a date and determining a first axle count based on said sensor data;
  b) means for collecting video images of said vehicle as it travels through said toll point;
  c) means for determining a second axle count based on said video images;
  d) means for collecting i) still camera images or ii) RFID identity data from said vehicle as it travels through said toll point, or both i) and ii) and means for determining vehicle identity based on i), or ii), or both i) and ii);
  e) means for comparing said first axle count and said second axle count and if identical, charging said vehicle based on said identical axle count; and means for optionally repeating steps c and e until said first axle count and said revised second axle count are identical, and if identity is not reached flagging said transaction record for human intervention.

* * * * *

UNITED STATES PATENT AND TRADEMARK OFFICE
CERTIFICATE OF CORRECTION

| | |
|---|---|
| PATENT NO. | : 11,961,335 B1 |
| APPLICATION NO. | : 17/357935 |
| DATED | : April 16, 2024 |
| INVENTOR(S) | : Anil Mirmira, David Patterson and Kelsey Heath |

It is certified that error appears in the above-identified patent and that said Letters Patent is hereby corrected as shown below:

In the Claims

On Column 17, Line 47, of Claim 11 part e):
"e) determining vehicle identity based on c or d or both e"
Should read as:
--- e) determining vehicle identity based on c or d or both c ---

Signed and Sealed this
Fourteenth Day of May, 2024

Katherine Kelly Vidal
*Director of the United States Patent and Trademark Office*